(12) United States Patent
Hiwatari et al.

(10) Patent No.: US 9,979,549 B2
(45) Date of Patent: May 22, 2018

(54) INFORMATION PROCESSING TO PERFORM AUTHENTICATION BETWEEN A PROVER AND A VERIFIER

(71) Applicant: Sony Corporation, Minato-ku (JP)

(72) Inventors: Harunaga Hiwatari, Kanagawa (JP); Koichi Sakumoto, Tokyo (JP); Masanobu Katagi, Kanagawa (JP); Kazuya Kamio, Tokyo (JP)

(73) Assignee: Sony Corporation, Tokyo (JP)

( * ) Notice: Subject to any disclaimer, the term of this patent is extended or adjusted under 35 U.S.C. 154(b) by 907 days.

(21) Appl. No.: 13/956,788

(22) Filed: Aug. 1, 2013

(65) Prior Publication Data

US 2014/0075199 A1     Mar. 13, 2014

(30) Foreign Application Priority Data

Sep. 10, 2012  (JP) .................................. 2012-198343

(51) Int. Cl.
*H04L 9/32*        (2006.01)
*H04L 9/14*        (2006.01)

(52) U.S. Cl.
CPC .............. *H04L 9/3247* (2013.01); *H04L 9/14* (2013.01); *H04L 9/3236* (2013.01)

(58) Field of Classification Search
CPC . H04L 9/3263; H04L 63/0823; H04L 9/3247; H04L 9/3236; H04L 9/14; H04L 9/3218; H04L 9/0825; H04L 9/0844; H04L 9/3268; H04L 63/12; H04L 63/126; H04L 9/006; H04L 9/0643; H04L 9/32; H04L 9/324

See application file for complete search history.

(56) References Cited

U.S. PATENT DOCUMENTS

| | | | | |
|---|---|---|---|---|
| 2010/0042842 A1* | 2/2010 | Huang | ................... | H04L 9/3247 713/176 |
| 2010/0235588 A1* | 9/2010 | Maeda | .................... | H04L 9/085 711/147 |
| 2012/0131681 A1* | 5/2012 | Layson | ................. | G06F 21/125 726/28 |
| 2013/0205376 A1* | 8/2013 | Narasimha | ............ | H04L 9/3247 726/6 |
| 2013/0227139 A1* | 8/2013 | Suffling | ................ | H04L 9/3236 709/225 |

FOREIGN PATENT DOCUMENTS

JP         2011-87284         4/2011

OTHER PUBLICATIONS

Moni Naor and Gil Segev, "Public-Key Cryptosystems Resilient to Key Leakage", Advances in Cryptology—CRYPTO 2009, vol. 5677 of the series Lecture Notes in Computer Science pp. 18-35.*

* cited by examiner

*Primary Examiner* — Catherine B Thiaw
*Assistant Examiner* — Quy C Pham
(74) *Attorney, Agent, or Firm* — Chip Law Group

(57) ABSTRACT

There is provided an information processing apparatus including a key selection section configured to select one out of a plurality of different secret keys, in a public key authentication scheme or a digital signature scheme in which each of the plurality of secret keys exists for one public key registered in a verifier, and a process execution section configured to execute, by using the secret key selected by the key selection section, an authentication process with the verifier by the public key authentication scheme or a digital signature generation process to the verifier by the digital signature scheme.

12 Claims, 16 Drawing Sheets

PUBLIC KEY AUTHENTICATION SCHEME load $r_0$     store $r_0 + x$ load $r_0$     store $r_0 + x$

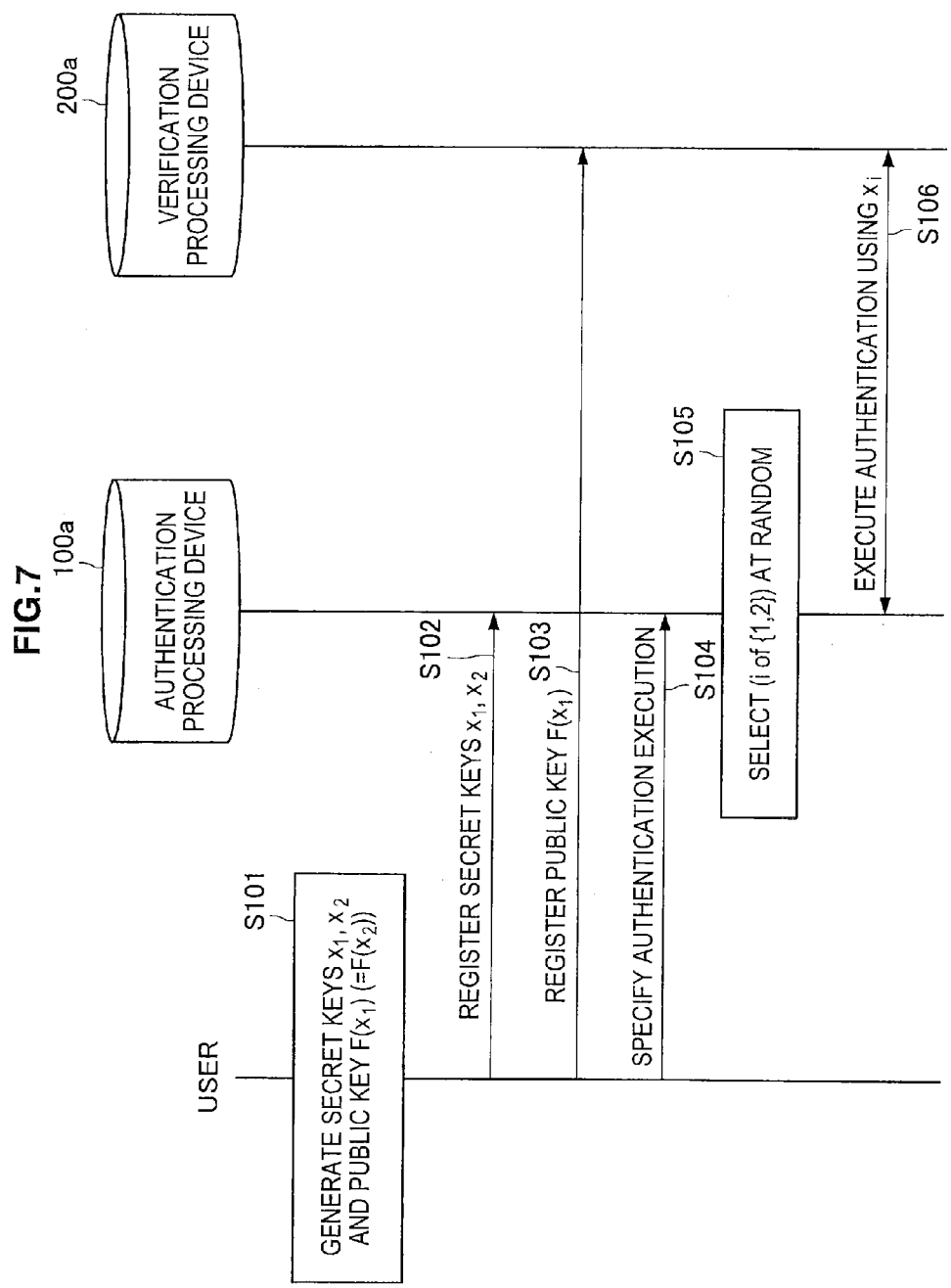

INFORMATION PROCESSING TO PERFORM AUTHENTICATION BETWEEN A PROVER AND A VERIFIER

BACKGROUND

The present disclosure relates to an information processing apparatus, an information processing method, and a non-transitory computer-readable medium.

With a rapid development of information processing technology and communication technology, digitisation of documents, official and private, is rapidly advancing. Accordingly, many individuals and companies are greatly interested in security management of electronic documents. With the increase in the interest, security against tampering, such as eavesdropping and forgery of electronic documents, has come to be hotly debated in many fields. The security against eavesdropping on an electronic document is ensured by encrypting the electronic document, for example. Also, the security against forgery of an electronic document is ensured by using a digital signature, for example. However, encryption and the digital signature have to be sufficiently tamper-resistant.

In general, public key encryption technology is widely used for personal verification. A public key encryption scheme is an authentication scheme where some person (prover) convinces another person (verifier) that she is the prover herself by using a public key and a secret key.

In this public key encryption technology, leakage of the secret key is an event which should be avoided the most. Since a secret key is necessary for authentication, signing or the like for personal verification, it is desirable that the prover can access the secret key as necessary. For example, it may be required for the prover to store a secret key such as a password, to carry a secret key written down on paper, or to carry a secret key stored in a device such as an IC card. For example, JP 2011-87284A discloses technology of an authentication system by an IC card in which a secret key is included.

SUMMARY

In public key encryption technology, since a secret key is not as easy to remember as a password, it is not easy for the prover to memorize the secret key. Further, if the secret key is written down on paper, there is a high risk that the contents of this secret key will be leaked to another person due to peaking or secret photography by the other person. In the public key encryption technology of the related art, since authentication is performed by using one type of secret key corresponding to one public key, if the secret key is leaked, it is not known whether the secret key was that used by the person herself or whether spoofing has been executed by another person. If the secret key is leaked, spoofing after the time of key leakage will not be able to be prevented unless spoofing is detected by some type of method.

On the other hand, in the case where a secret key is stored in a device such as an IC card, spoofing by another person will be difficult unless this IC card is lost. In the case where the IC card is lost, if the use of the secret key stored on the IC card is suspended, spoofing by another person can be prevented, and expansion of the damage can be suppressed. However, an analysis method such as a side-channel attack has been proposed for a device such as an IC card, and if countermeasures are not applied for this side-channel attack, the secret key may be leaked.

Further, in the case where authentication by dispersion to a plurality of servers, signatures by a plurality of users, or the like is to be implemented, the rights of signature generation or authentication can be shared for a plurality of people, and group signature technology has been proposed, for example, as technology for sharing the rights of signature generation for a plurality of people. However, this group signature technology refers only to some specific signature schemes, for specialized applications which share the rights of signature generation for a plurality of people, and the above described case is not able to be achieved in an arbitrary signature scheme or authentication scheme.

Simply, the sharing of a same secret key by a plurality of users can be considered as another method for sharing the rights of signature generation or authentication for a plurality of people. However, in this method which shares a secret key, other users may suffer damage due to a leakage of the secret key from the management of the key by a neglectful user. Further, since the same secret key is shared by a plurality of users, a situation can also be considered in which specifying the user who leaked the secret key will become difficult, even if trying to find the user who leaked the secret key from the leaked secret key.

Accordingly, the present disclosure is made by considering such a situation. According to an embodiment of the present disclosure, there is provided a new and improved information processing apparatus, information processing method, and non-transitory computer-readable medium which implements a detection method of key leakage, a prevention method of key leakage, and a suppression method of key leakage, by using a plurality of secret keys for a same public key.

According to an embodiment of the present disclosure, there is provided an information processing apparatus including a key selection section configured to select one out of a plurality of different secret keys, in a public key authentication scheme or a digital signature scheme in which each of the plurality of secret keys exists for one public key registered in a verifier, and a process execution section configured to execute, by using the secret key selected by the key selection section, an authentication process with the verifier by the public key authentication scheme or a digital signature generation process to the verifier by the digital signature scheme.

According to an embodiment of the present disclosure, there is provided an information processing method including selecting one out of a plurality of different secret keys, in a public key authentication scheme or a digital signature scheme in which each of the plurality of secret keys exists for one public key registered in a verifier, and executing, by using the secret key selected by the key selection step, an authentication process with the verifier by the public key authentication scheme or a digital signature generation process to the verifier by the digital signature scheme.

According to an embodiment of the present disclosure, there is provided a non-transitory computer-readable medium including a computer program, which when executed by a computer, causes the computer to select one out of a plurality of different secret keys, in a public key authentication scheme or a digital signature scheme in which each of the plurality of secret keys exists for one public key registered in a verifier, and execute, by using the secret key selected by the key selection step, an authentication process with the verifier by the public key authentication scheme or a digital signature generation process to the verifier by the digital signature scheme.

According to an embodiment of the present disclosure, there is provided an information processing apparatus including a comparison processing section configured to acquire, in a public key authentication scheme or an digital signature scheme in which a plurality of different secret keys exist for one public key, a first hash value obtained by a prover applying a hash function to a first secret key within the plurality of secret keys, and a second hash value obtained by the prover applying a hash function to a secret key used when performing an authentication process with a verifier or a digital signature generation process to the verifier by the digital signature scheme; compare the first hash value and the second hash value when performing a verification process using the public key authentication scheme or the digital signature scheme; and execute a prescribed notification process to the prover in accordance with a result of the comparison.

According to the present disclosure such as described above, a new and improved information processing apparatus, information processing method, and non-transitory computer-readable medium can be provided which implements a detection method of key leakage, a prevention method of key leakage, and a suppression method of key leakage, by using a plurality of secret keys for a same public key.

BRIEF DESCRIPTION OF THE DRAWINGS

FIG. 7 is a flow chart which shows the operations of a first embodiment of the present disclosure;

DETAILED DESCRIPTION OF THE EMBODIMENT(S)

Figure 1:
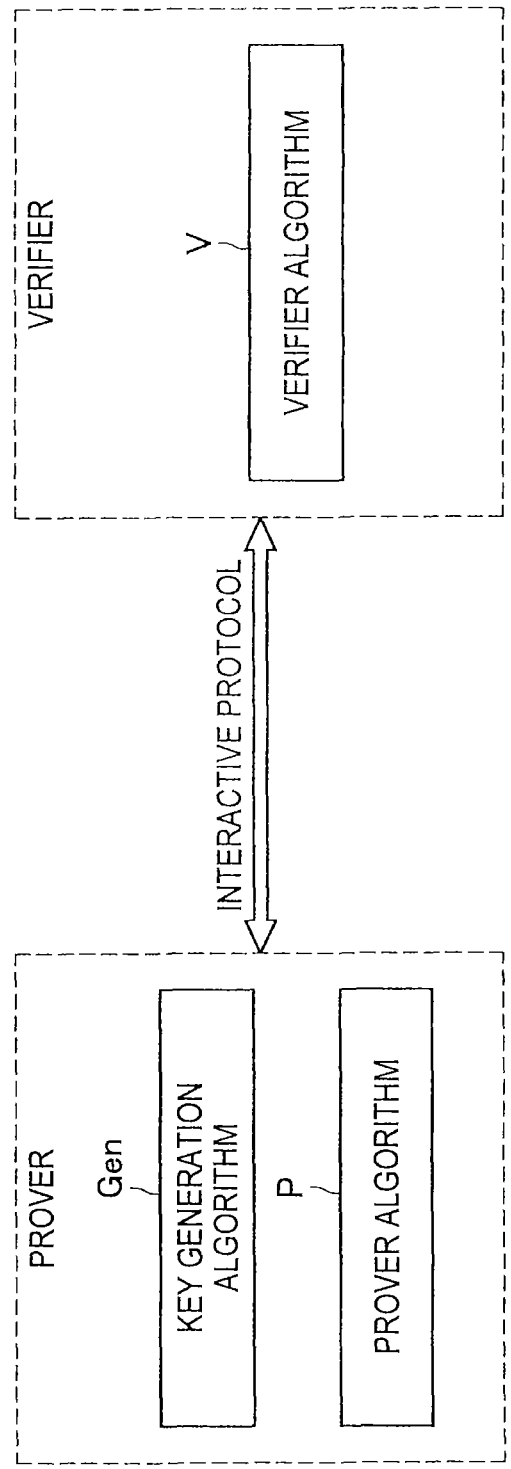
FIG. 1 is an explanatory view illustrating a configuration of an algorithm according to a public key authentication scheme.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
<1. Description of a public key authentication scheme and a secret key>
<2. The first embodiment of the present disclosure>
[Overview]
[Operations]
<3. The second embodiment of the present disclosure>
[Overview]
[Operations]
<4. The third embodiment of the present disclosure>
[Overview]
<5. Modified examples>
<6. Hardware configuration>
<7. Conclusion>

1. DESCRIPTION OF A PUBLIC KEY AUTHENTICATION SCHEME AND A SECRET KEY

Prior to describing suitable embodiments of the present disclosure, first an overview of a public key authentication scheme and a digital signature scheme will be described, and to continue, a secret key used by each of the later described embodiments of the present embodiment will be described.

A public key authentication scheme is an authentication scheme where a person (prover) convinces another person (verifier) that she is the prover herself by using a public key pk and a secret key sk. For example, a public key $pk_A$ of a prover A is made known to the verifier. On the other hand, a secret key $sk_A$ of the prover A is secretly managed by the prover. According to the public key authentication scheme, a person who knows the secret key $sk_A$ corresponding to the public key $pk_A$ is regarded as the prover A herself.

In the case the prover A attempts to prove to a verifier B that she is the prover herself, the prover A can perform an interactive protocol with the verifier B and prove that she knows the secret key $sk_A$ corresponding to the public key $pk_A$. Then, in the case it is proved by the verifier B, by the interactive protocol, that the prover A knows the secret key $sk_A$, the legitimacy of the prover A (that she is the prover herself) is proved.

Additionally, to ensure security of the public key authentication scheme, two conditions set forth below are to be satisfied.

The first condition is to lower as much as possible the probability of falsification being established, at the time the interactive protocol is performed, by a falsifier not having the secret key sk. That this first condition is satisfied is called "soundness." In other words, with a sound interactive protocol, falsification is not established by a falsifier not having the secret key sk with a non-negligible probability. The second condition is that, even if the interactive protocol is performed, information on the secret key $sk_A$ of the prover A is not at all leaked to the verifier B. That this second condition is satisfied is called "zero knowledge."

The security of the public key authentication scheme is ensured by using an interactive protocol having the soundness and zero knowledge as described above.

In a model of the public key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed is used to prove to the verifier of possession of the secret key sk corresponding to the public key pk. Formally, the key generation algorithm Gen is represented as formula (1) below as an algorithm that takes security parameter $1^\lambda$ ($\lambda$ is an integer of 0 or more) as an input and outputs the secret key sk and the public key pk.

$$(sk, pk) \leftarrow \text{Gen}(1^\lambda) \qquad (1)$$

(Prover Algorithm P)

The prover algorithm P is used by a prover. The prover algorithm P is an algorithm for proving possession of the secret key sk corresponding to the public key pk. The prover algorithm P is defined as an algorithm that takes the public key pk and the secret key sk of a prover as inputs and performs the interactive protocol with a verifier.

(Verifier Algorithm V)

The verifier algorithm V is used by a verifier. The verifier algorithm V is an algorithm for verifying, in the interactive protocol, whether or not a prover possesses the secret key sk corresponding to the public key pk. The verifier algorithm V is defined as an algorithm that takes the public key pk of a prover as an input, and that outputs 0 or 1 (1 bit) after performing the interactive protocol with the prover. Moreover, in the case of output 0, the prover is assumed to be illegitimate, and in the case of output 1, the prover is assumed to be legitimate. Formally, the verifier algorithm V is represented as formula (2) below.

$$0/1 \leftarrow V(pk) \qquad (2)$$

As described above, the public key authentication scheme has to satisfy two conditions, i.e. soundness and zero knowledge, to ensure security. However, in order to make a prover prove that she possesses the secret key sk, it is necessary that the prover perform a procedure dependent on the secret key sk, notify the verifier of the result and make the verifier perform verification based on the notified contents. Execution of the procedure dependent on the secret key sk is necessary to guarantee the soundness. On the other hand, it is necessary that information on the secret key sk is not at all leaked to the verifier even when the result of the procedure is notified to the verifier. Accordingly, it is necessary that the key generation algorithm Gen, the prover algorithm P, and the verifier algorithm V are designed so as to satisfy these terms.

Figure 2:
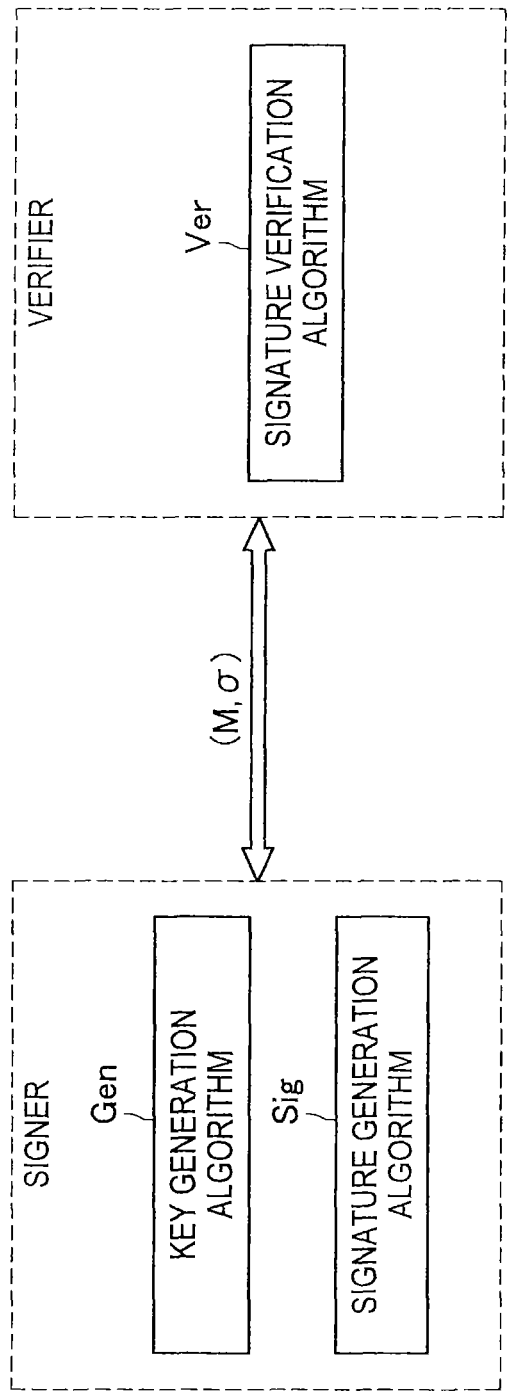
FIG. 2 is an explanatory view illustrating a configuration of an algorithm according to a digital signature scheme.

Next, an overview of the algorithm of a digital signature scheme will be provided with reference to FIG. 2. FIG. 2 is an explanatory view illustrating an overview the algorithm of a digital signature scheme.

In contrast to paper documents, it is difficult to put a stamp or affix a signature to digitized data. Thus, to prove the creator of digitized data, an electronic mechanism achieving an effect similar to putting a stamp or affixing a signature is necessary. The mechanism is the digital signature. The digital signature is a mechanism in which signature data known only to the creator of data is provided to a recipient by associating with the data and the signature data is verified by the recipient.

(Model)

In a model of the digital signature scheme, as shown in FIG. 2, two entities called a signer and a verifier exist. Then, the model of the digital signature scheme includes three algorithms of the key generation algorithm Gen, a signature generation algorithm Sig, and a signature verification algorithm Ver.

The signer generates a pair of a signature key sk and a verification key pk unique to the signer by using the key generation algorithm Gen. The signer also generates a digital signature σ to be attached to a document M by using the signature generation algorithm Sig. That is, the signer is an entity that attaches a digital signature to the document M. On the other hand, the verifier verifies the digital signature σ attached to the document M by using the signature verification algorithm Ver. That is, the verifier is an entity that verifies the digital signature σ to check whether the creator of the document M is the signer.

In the description that follows, the expressions of "signer" and "verifier" are used and these expressions mean entities in a strict sense. Therefore, the main body executing the key generation algorithm Gen and the signature generation algorithm Sig is an information processing apparatus corresponding to the entity of the "signer". Similarly, the main body executing the signature verification algorithm Ver is an information processing apparatus. The hardware configuration of these information processing apparatuses is, for example, as shown in FIG. 38. That is, the key generation algorithm Gen, the signature generation algorithm Sig, and the signature verification algorithm Ver are executed by the CPU 902 or the like based on a program recorded in the ROM 904, the RAM 906, the storage unit 920, the removable recording medium 928 or the like.

(Key Generation Algorithm Gen)

The key generation algorithm Gen is used by the signer. The key generation algorithm Gen is an algorithm that generates a pair of the signature key sk and the verification key pk unique to the signer. The verification key pk generated by the key generation algorithm Gen is made public. On the other hand, the signature key sk generated by the key generation algorithm Gen is managed in secret by the signer. Then, the signature key sk is used for the generation of the digital signature σ to be attached to the document M. For example, the key generation algorithm Gen takes a security parameter $1^\lambda$ (λ is an integer equal to 0 or greater) as input and outputs the signature key sk and the verification key pk. In this case, the key generation algorithm Gen can be expressed formally like the following formula (3):

$$(sk, pk) \leftarrow \text{Gen}(1^\lambda) \quad (3)$$

(Signature Generation Algorithm Sig)

The signature generation algorithm Sig is used by the signer. The signature generation algorithm Sig is an algorithm that generates the digital signature σ to be attached to the document M. The signature generation algorithm Sig is an algorithm that takes the signature key sk and the document M as input and outputs the digital signature σ. The signature generation algorithm Sig can formally be expressed like the following formula (4):

$$\sigma \leftarrow \text{Sig}(sk, M) \quad (4)$$

(Signature Verification Algorithm Ver)

The signature verification algorithm Ver is used by the verifier. The signature verification algorithm Ver is an algorithm to verify whether the digital signature σ is a valid digital signature to the document M. The signature verification algorithm Ver is an algorithm that takes the verification key pk of the signer, the document M, and the digital signature σ as input and outputs 0 or 1 (1 bit). The signature verification algorithm Ver can formally be expressed like the following formula (5): The verifier judges that the digital signature σ is invalid if the signature verification algorithm Ver outputs 0 (the verification key pk rejects the document M and the digital signature σ) and judges that the digital signature σ is valid if the signature verification algorithm Ver outputs 1 (the verification key pk accepts the document M and the digital signature σ).

$$0/1 \leftarrow \text{Ver}(pk, M, \sigma) \quad (5)$$

(n-Pass Public Key Authentication Scheme)

Figure 3:
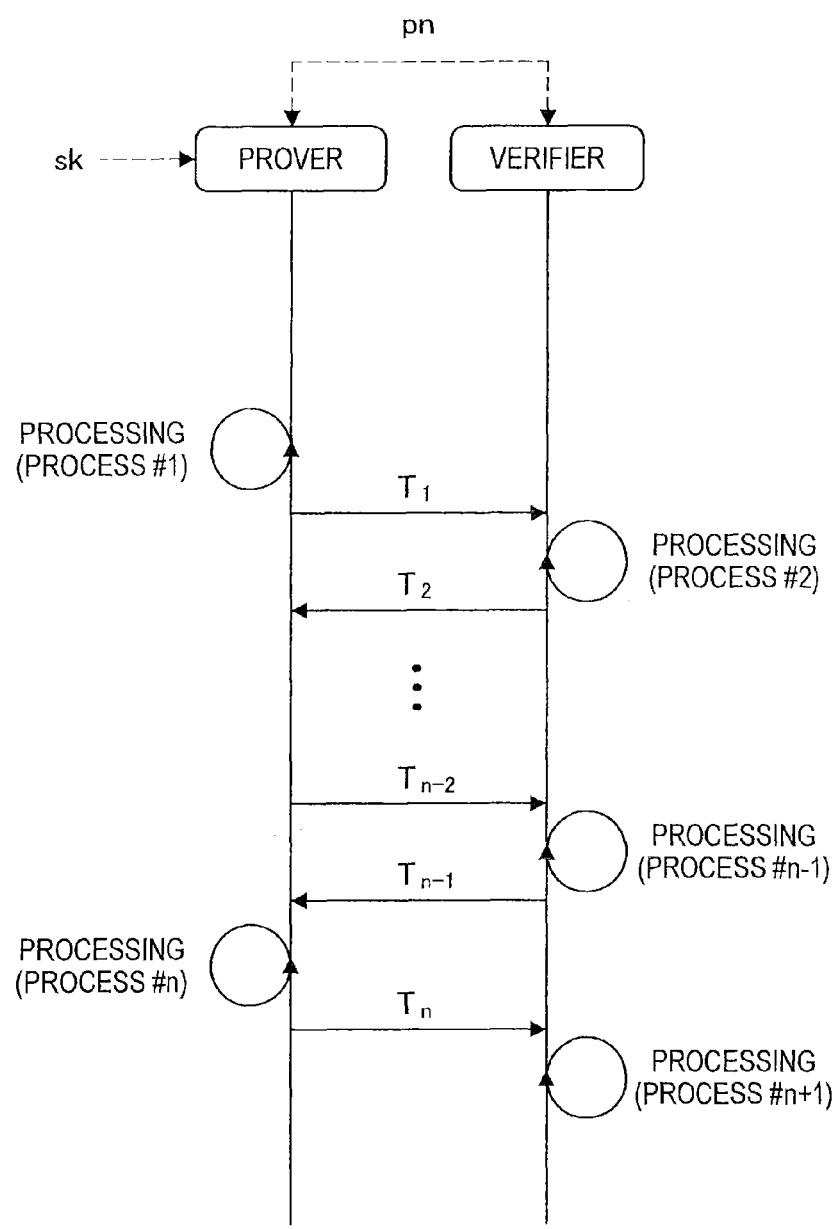
FIG. 3 is an explanatory view illustrating a configuration of an algorithm according to an n-pass public key authentication scheme.

Next, an n-pass public key authentication scheme will be described with reference to FIG. 3. FIG. 3 is an explanatory view illustrating an n-pass public key authentication scheme.

The public key authentication scheme is, as described above, an authentication scheme that proves to the verifier that the prover holds the secret key sk corresponding to the public key pk during interactive protocol. Moreover, it is necessary for the interactive protocol to satisfy two conditions of soundness and zero knowledge. Thus, as shown in FIG. 3, the prover and the verifier exchange information n times while each performing respective processing.

In the n-pass public key authentication scheme, processing (process #1) is performed by the prover by using the prover algorithm P and information $T_1$ is transmitted to the verifier. Next, processing (process #2) is performed by the verifier by using the verifier algorithm V and information $T_2$ is transmitted to the prover. Further, processing is performed and information $T_k$ is transmitted sequentially for k=3 to n before processing (process #n+1) is performed lastly. The scheme by which information is transmitted and received n times as described above is called the "n-pass" public key authentication scheme.

In the foregoing, the n-pass public key authentication scheme has been described.

As described above, there are public key authentication schemes and digital signature schemes, for example, disclosed in JP 2012-98690A, which take a basis for security from the difficulty in solving multi-order multivariate simultaneous equations, as satisfying the requirements when designing the key generation algorithm Gen, the prover algorithm P, and the verifier algorithm V. A function used by JP 2012-98690A is a function constituted by an n variable quadratic polynomial in m lines (m and n are each integers of 2 or more), and by using this function, a public key authentication scheme such as that of JP 2012-98690A can generate a plurality of secret keys from one public key. The function constituted by an n variable multi-order polynomial in m lines used by JP 2012-98690A is called an MQ (Multivariate Quadratic) function.

First, a key generation algorithm of the public key authentication scheme by JP 2012-98690A will be described. Here, the case will be considered where a set of quadratic polynomials $(f_1(x), \ldots, f_m(x))$ are used as one part of the public key pk. However, the quadratic polynomial $f_i(x)$ is expressed such as in the following formula (6). Further, a vector $(x_1, \ldots, x_n)$ is represented as x, and the set of quadratic polynomials $(f_1(x), \ldots, f_m(x))$ is represented as a multivariable polynomial F(x).

$$f_i(x_1, \ldots, x_n) = \sum_{j,k} a_{ijk} x_j x_k + \sum_j b_{ij} x_j \quad (6)$$

Further, the set of quadratic polynomials $(f_1(x), \ldots, f_m(x))$ can be expressed such as in the following formula (7). Further, $A_1, \ldots, A_m$ are n×n matrices. In addition, $b_1, \ldots, b_m$ are each an n×1 vector.

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \quad (7)$$

When using this expression, the multivariable polynomial F can be expressed such as in the following formulas (8) and (9). The establishment of this expression can be easily ascertained from the following formula (10).

$$F(x+y) = F(x) + F(y) + G(x, y) \quad (8)$$

$$G(x, y) = \begin{pmatrix} y^T & (A_1^T + A_1)x \\ \vdots & \\ y^T & (A_m^T + A_m)x \end{pmatrix} \quad (9)$$

$$\begin{aligned} f_1(x+y) &= (x+y)^T A_1(x+y) + b_1^T(x+y) \quad (10) \\ &= x^T A_1 x + x^T A_1 y + y^T A_1 x + y^T A_1 y + b_1^T x + b_1^T y \\ &= f_1(x) + f_1(y) + x^T A_1 y + y^T A_1 x \\ &= f_1(x) + f_1(y) + x^T (A_1^T)^T y + y^T A_1 x \\ &= f_1(x) + f_1(y) + (A_1^T x)^T y + y^T A_1 x \\ &= f_1(x) + f_1(y) + y^T (A_1^T x) + y^T A_1 x \\ &= f_1(x) + f_1(y) + y^T (A_1^T + A_1)x \end{aligned}$$

At the time when dividing into such a first portion, in which F(x+y) depends on x, a second portion, in which F(x+y) depends on y, and a third portion, in which F(x+y) depends on both x and y, a term G(x,y) corresponding to the third portion becomes bilinear for x and y. Hereinafter, there will be cases where the item G(x,y) is called a bilinear item. When using this property, it becomes possible to build an efficient algorithm.

For example, the multivariable polynomial $F_1(x)$, which is used for a mask of a multivariable polynomial F(x+r), is represented as $F_1(x)=G(x,t_0)+e_0$ by using vectors ($t_0$ of $K^n$) and ($e_0$ of $K^m$). In this case, the sum of the multivariable polynomials $F(x+r_0)$ and $F_1(x)$ is expressed such as in the following formula (11). Here, if $t_1=r_0+t_0$ and $e_1=F(r_0)+e_0$, the multivariable polynomial $F_2(x)=F(x+r_0)+F_1(x)$ can be expressed by the vectors ($t_1$ of $K^n$) and ($e_1$ of $K^m$). Therefore, if setting $F_1(x)=G(x,t_0)+e_0$, $F_1$ and $F_2$ can be expressed by using a vector on $K^n$ and a vector on $K^m$, and it becomes possible for an efficient algorithm to be expressed with a reduced data size necessary for communication.

$$\begin{aligned} F(x+r_0) + F_1(x) &= F(x) + F(r_0) + G(x, r_0) + G(x, t_0) + e_0 \quad (11) \\ &= F(x) + G(x, r_0 + t_0) + F(r_0) + e_0 \end{aligned}$$

Note that information related to $r_0$ from $F_2$ (or $F_1$) is not leaked at all. For example, as long as $e_0$ and $t_0$ (or $e_1$ and $t_1$) are not known, the information of $r_0$ is not able to be known at all, even if provided with $e_1$ and $t_1$ (or $e_0$ and $t_0$). Therefore, a zero-knowledge property is secured.

Here, in the case of m=n, an MQ function can obtain $x_1$ and $x_2$ which becomes $F(x_1)=F(x_2)$. The specific derivation method is as follows.

When n=m, at the time when ($\Delta$ of GF) ($2^n$) is provided for the MQ function, an algorithm will exist which outputs x(s.t. $F(x)=F(x+\Delta)$. This is because the following function holds.

$$F(x)=F(x+\Delta) \leftrightarrow *F(\Delta)+G(x,\Delta)=0$$

The above described function becomes a simultaneous linear equation which relates to $x=(x_1, \ldots, x_n)$ and $x_i=GF(2)$. Since the number of the variables $x_i$ (i=1, 2, ..., n) and the line number m of the formula matches, a solution x can be derived from the above described simultaneous linear equation.

Further, when n=cm (c is an integer of 2 or more), at the time when ($\Delta_1, \ldots, \Delta_c$ of GF) ($2^n$) is provided for the MQ function, an algorithm will exist which outputs x(s.t. $F(x)=F(x+\Delta_1)=\ldots=F(x+\Delta_c)$. This is because the following functions hold.

$$F(x)=F(x+\Delta_1) \leftrightarrow F(\Delta_1)+G(x,\Delta_1)=0$$

$$F(x)=F(x+\Delta_c) \leftrightarrow F(\Delta_c)+G(x,\Delta_c)=0$$

Each of the above described equations becomes a simultaneous linear equation which relates to $x=(x_1, \ldots, x_n)$ and $x_i=GF(2)$. When combining each of the above described equations, the line number of the equation becomes a simultaneous linear equation of cm for the variables xi (i=1, 2, ..., n). Therefore, similar to the case of n=m, a solution x can be derived from the above described simultaneous linear equation.

In this way, a detection method of key leakage, a prevention method of key leakage, and a suppression method of key leakage can be implemented, by using a public key authentication scheme which can generate a plurality of secret keys from one public key. Hereinafter, an application example of a public key authentication scheme, which can generate a plurality of secret keys from one public key, will be described in detail.

2. THE FIRST EMBODIMENT OF THE PRESENT DISCLOSURE

[Overview]

First, an overview of a first embodiment of the present disclosure will be described. The first embodiment of the present disclosure is technology applicable to the case where a secret key is stored in a device such as an IC card, and an authentication process is executed by the device for personal verification.

Figure 4:
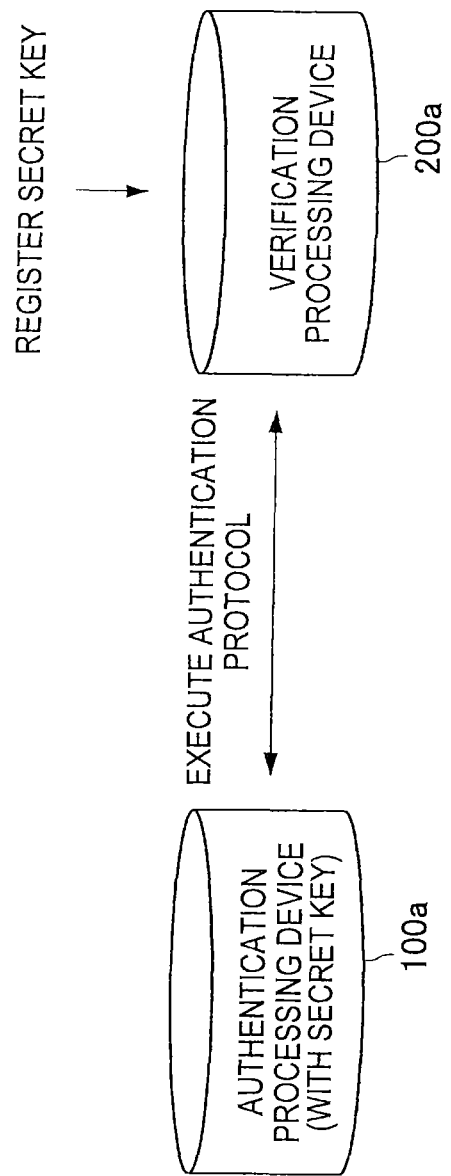
FIG. 4 is an explanatory view illustrating an overview of an authentication process between an authentication processing device 100a, in which a secret key is stored, and a verification processing device 200a which executes a verification process.

FIG. 4 is an explanatory view illustrating an overview of an authentication process between an authentication processing device 100*a*, in which a secret key is stored, and a verification processing device 200*a* which executes a verification process. A secret key x, which is generated by the above described key generation algorithm Gen, is stored in the authentication processing device 100*a* prior to an authentication process. Further, a public key F(x), which is generated by the above described key generation algorithm Gen, is stored in the verification processing device 200*a* prior to an authentication process. For example, the authentication processing device 100*a* is an IC card, and the verification processing device 200*a* is a server apparatus, an ATM (Automated Teller machine) of a financial institution, or the like. Also, an authentication protocol between the authentication processing device 100*a* and the verification processing device 200*a* is executed, at the time when the authentication processing device 100*a* is held over a reader/writer.

Figure 5:
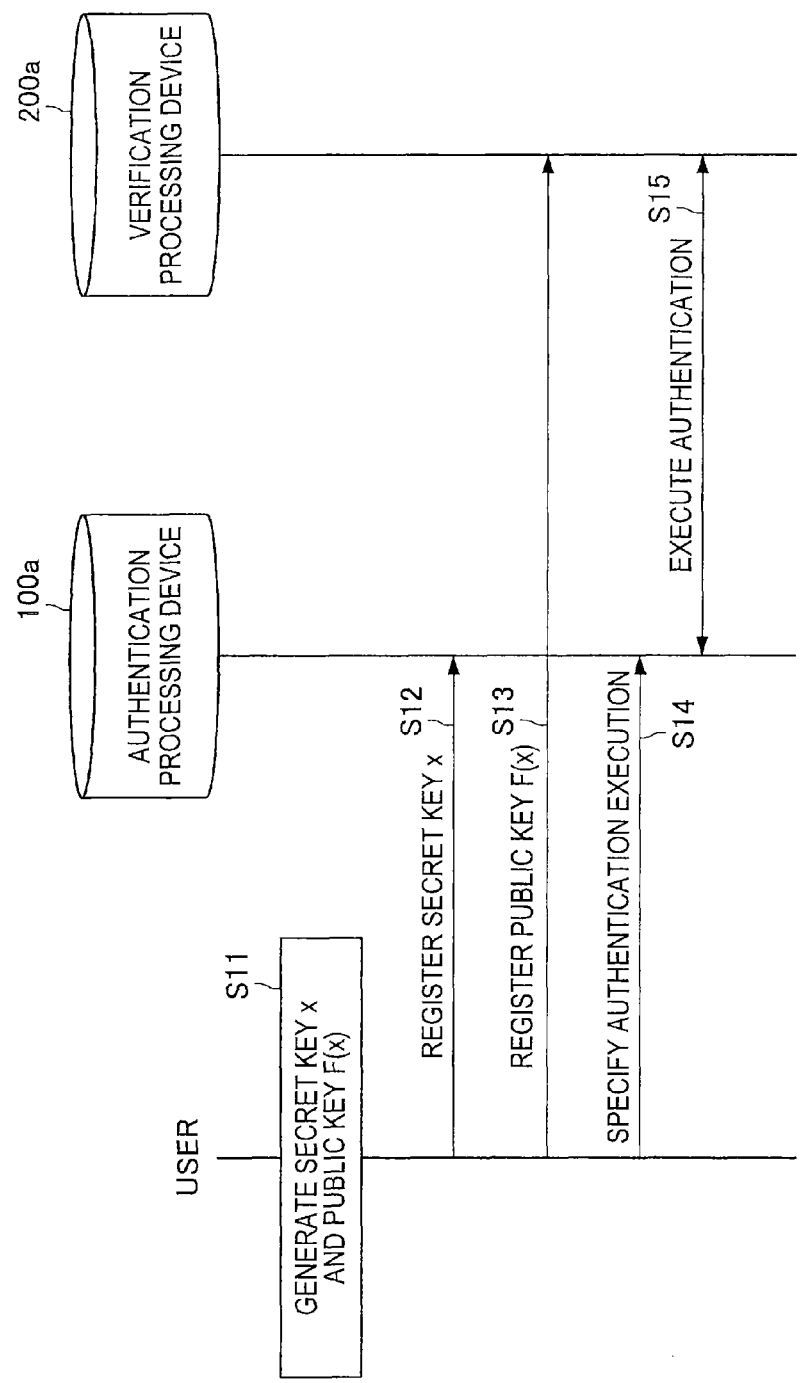
FIG. 5 is a flow chart which shows an authentication process between an authentication processing device 100a, in which a secret key is stored, and a verification processing device 200a which executes a verification process.

FIG. 5 is a flow chart which shows an authentication process between the authentication processing device 100*a*, in which a secret key is stored, and the verification processing device 200*a* which executes a verification process.

A user who wants to authenticate that she is the person herself generates a secret key x and a public key F(x) in advance by the above described key generation algorithm Gen (step S11). The generation of this secret key x and public key F(x) is performed by an information processing apparatus capable of executing the key generation algorithm Gen.

When the user generates a secret key x and a public key F(x), the secret key x is registered in the authentication processing device 100*a* while maintaining secrecy (step S12), and the public key F(x) is registered in the verification processing device 200a (step S13). Then, when the user specifies authentication execution to the authentication processing device 100a (step S14), a prover algorithm P is executed by the authentication processing device 100a, and an authentication process between the authentication processing device 100a and the verification processing device 200a is executed, by a verifier algorithm V being executed in the verification processing device 200a (step S15).

If the secret key x is stored in a device such as an IC card, the contents of the secret key x are not expected to be leaked to a third party as long as this device is not lost. However, as described above, an analysis method such as a side-channel attack has been proposed for a device such as an IC card. Within this side-channel attack, there is a power analysis attack. A power analysis attack is an attack method which extracts, from the power consumption of a device in which a cryptographic algorithm is implemented, a secret key stored in this device.

The power consumption of a device such as an IC card is known to change depending on the input. Therefore, there are cases where the value of a secret key can be analyzed by observing a change in the power consumption which depends on the value of the secret key stored in the device. Basically, since noise is mixed in the power consumption, the influence of the noise is reduced and the secret key is extracted, by statistically processing a plurality of waveforms in a power analysis attack. Differential Power Analysis (DPA) has been proposed as one such method (Paul Kocher, Joshua Jaffe, Benjamin Jun, "Differential Power Analysis", CRYPTO'99).

Here, an example of a 1 bit DPA for a signature scheme using an MQ function (MQ signature scheme) will be described. In an MA signature scheme, an exclusive-OR operation of a random number $r_0$ is performed for the secret key x, and after this, the random number $r_0$ is output at random as an element in the signature. An $i^{th}$ bit $x_i$ of the secret key x can be analyzed by using this operation. Specifically, $x_i$ can be analyzed by a 1 bit DPA such as described as follows.

First, after a plurality of signatures are generated, the signatures in which the random number $r_0$ is output are gathered. Next, the gathered signatures are divided into two groups, in accordance with a value of the $i^{th}$ bit $r_{0,i}$ of the random number $r_0$. Then, an average waveform is calculated for each group, and a differential waveform of these two average waveforms is calculated. An $i^{th}$ bit $x_i$ of the secret key x can be analyzed by the attitude of the peaks of this differential waveform.

Figure 6A:
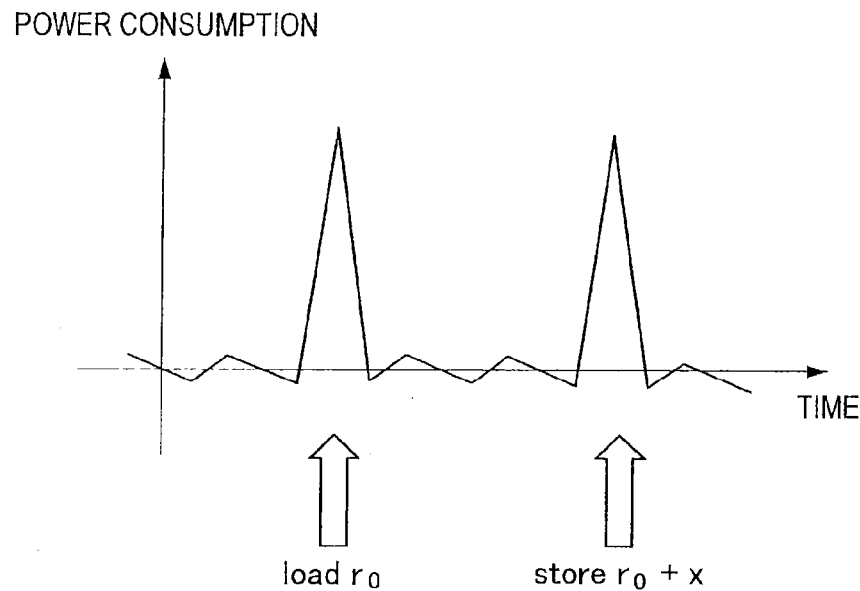
FIG. 6A is an explanatory view which shows an example of a differential waveform of an average waveform.
Figure 6B:
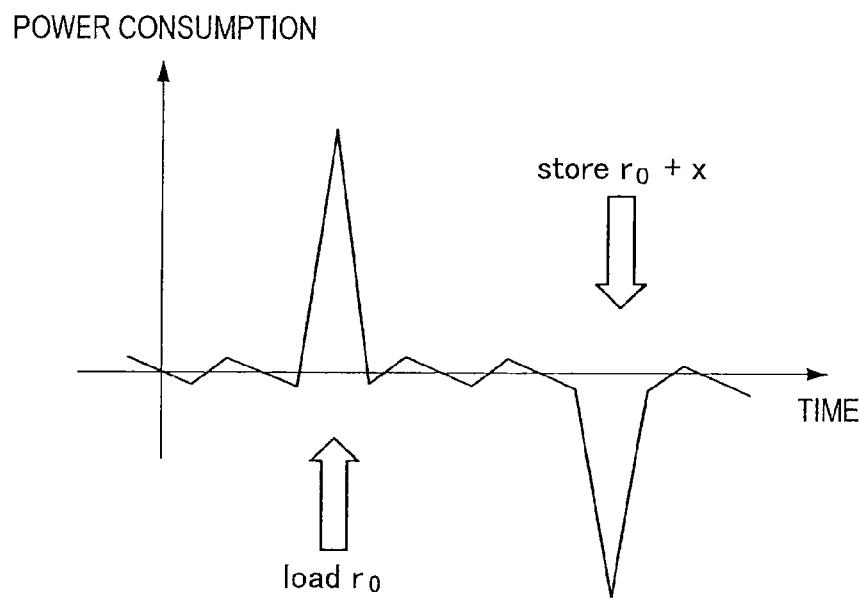
FIG. 6B is an explanatory diagram which shows an example of a differential waveform of an average waveform.

FIGS. 6A and 6B are explanatory views which show an example of a differential waveform of an average waveform. FIG. 6A is an example of a differential waveform of an average waveform which can be expected at the time when the $i^{th}$ bit $x_i$ of the secret key x is 0, and FIG. 6B is an example of a differential waveform of an average wavelength which can be expected at the time when the $i^{th}$ bit $x_i$ of the secret key x is 1. At the time when $x_i$ is 0, the value of the random number $r_0$ and the value of the exclusive-OR between the random number $r_0$ and the secret key $x_0$ ($r_0+x_0$) match each other. Therefore, the power consumption at the time of loading and at the time of storing these values is similar, and as shown in FIG. 6A, the two positive and negative peaks of the average waveform become the same. On the other hand, at the time when $x_i$ is 1, the value of the random number $r_0$ and the value of the exclusive-OR between the random number $r_0$ and the secret key $x_0$ ($r_0+x_0$) are different. Therefore, the power consumption at the time of loading and at the time of storing these values is significantly different, and as shown in FIG. 6B, the two positive and negative peaks of the average waveform become different. The contents of the secret key x may be extracted by a power analysis attack by attempting an analysis for all the bits of this secret key x.

While this is an example of a 1 bit DPA when performing an MQ signature scheme, a similar process exists for an MQ authentication scheme. Therefore, a 1 bit DPA of an MQ signature scheme can be easily expanded to a 1 bit DPA of an MQ authentication scheme.

Accordingly, in the first embodiment of the present disclosure, the value of a bit is not able to be estimated from the differential waveform of an average waveform obtained by a power analysis attack. Specifically, as described above, a plurality of secret keys corresponding to one public key are generated, and when performing an authentication process, the authentication processing device 100a selects one secret key at random from among this plurality of secret keys. In this way, the authentication processing device 100a can prevent a secret key from being extracted by a power analysis attack, by selecting one secret key at random from among a plurality of secret keys and executing an authentication process.

[Operations]

FIG. 7 is a flow chart which shows an authentication process between the authentication processing device 100a, in which a secret key is stored, and the verification processing device 200a which executes a verification process, according to the first embodiment of the present disclosure. The flow chart shown in FIG. 7 shows an authentication process in the case where a user who wants to authenticate that she is the person herself generates a public key and two secret keys corresponding to this public key.

The user who wants to authenticate that she is the person herself generates secret keys $x_1$, $x_2$ and a public key $F(x_1)$ in advance by the above described key generation algorithm Gen (step S101). Here, the public key $F(x_1)$ satisfies $F(x_1)=F(x_2)$. The generation of these secret keys $x_1$, $x_2$ and public key $F(x_1)$ is performed by an information processing apparatus capable of executing the key generation algorithm Gen.

When the user generates secret keys $x_1$, $x_2$ and a public key $F(x_1)$, the secret keys $x_1$, $x_2$ are registered in the authentication processing device 100a while maintaining secrecy (step S102), and the public key $F(x_1)$ is registered in the verification processing device 200a (step S103). Then, when the user specifies authentication execution to the authentication processing device 100a (step S104), the authentication processing device 100a first selects (i of {1,2}) at random (step S105). Then, an authentication process is executed, by a prover algorithm P and a verifier algorithm V, using a secret key $x_i$ corresponding to the i selected in the above described step S105, between the authentication processing device 100a and the verification processing device 200a (step S106).

In this way, when performing an authentication process, a 1 bit DPA by a power analysis attack becomes difficult, due to the authentication processing device 100a selecting one secret key at random from among the two secret keys. This is because when the $i^{th}$ bit $x_{1,i}$ of a secret key $x_1$ and the $i^{th}$ bit $x_{2,i}$ of a secret key $x_2$ are different, statistical processing is not able to be accurately performed. While the above described 1 bit DPA estimates the value of a bit in which the differential waveform of an average waveform is calculated, since a peak will not appear by calculating the differential waveform of an average waveform, if the value of some bit is different for each process, it will become extremely difficult to estimate the value of this bit.

On the other hand, since the authentication processing device 100a only selects one secret key from among the two secret keys at the time when performing authentication execution, it may not be necessary to include unnecessary circuits for countermeasures against a power analysis attack, and it may not be necessary to execute unnecessary processes. Therefore, the authentication processing device 100a can implement countermeasures against a power analysis attack with a low cost, and with almost no reduction in speed or increase in power consumption.

3. THE SECOND EMBODIMENT OF THE PRESENT DISCLOSURE

[Overview]

Next, an overview of a second embodiment of the present disclosure will be described. The second embodiment of the present disclosure is technology applicable to the case where a user inputs the contents of a secret key generated in advance to a device at the time when performing authentication for personal verification.

Figure 8:
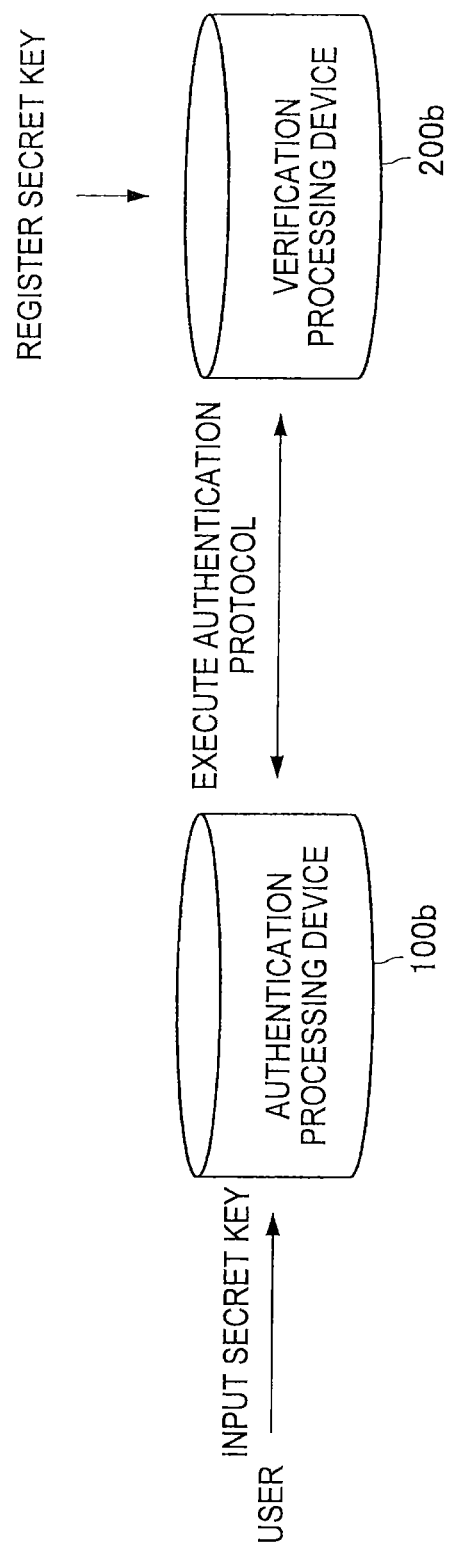
FIG. 8 is an explanatory view which shows an overview of an authentication process between an authentication processing device 100b, in which a secret key is stored, and a verification processing device 200b which executes a verification process.

FIG. 8 is an explanatory view which shows an overview of an authentication process between an authentication processing device 100b which executes an authentication process and a verification processing device 200b which executes a verification process. A secret key x, which is generated by the above described key generation algorithm Gen, is input to the authentication processing device 100b by a user who wants to receive personal verification. Further, a public key F(x), which is generated by the above described key generation algorithm Gen, is stored in the verification processing device 200b prior to an authentication process by a prover algorithm P and a verifier algorithm V.

For example, the authentication processing device 100b is a front end apparatus, and may be, other than an information processing apparatus such as a personal computer, a smart phone or tablet, for example, an ATM (Automated Teller machine) or the like of a financial institution. For example, the verification processing device 200b is a back end apparatus, and is a server apparatus or the like. Also, an authentication protocol between the authentication processing device 100b and the verification processing device 200b is executed, by the prover algorithm P and the verifier algorithm V, at the time when the authentication processing device 100b performs an input of a secret key from a user.

Figure 9:
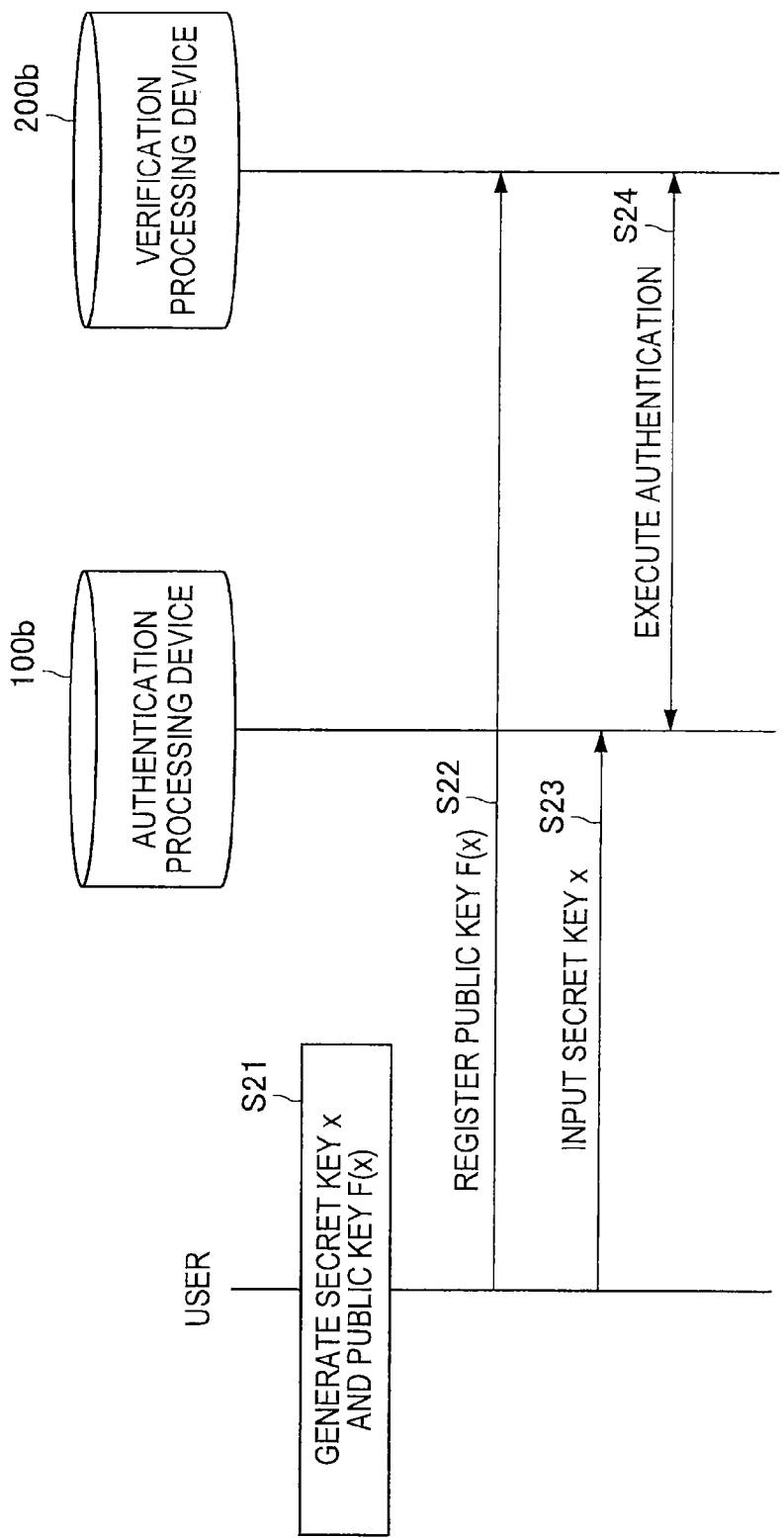
FIG. 9 is a flow chart which shows an authentication process between an authentication processing device 100b, in which a secret key is stored, and a verification processing device 200b which executes a verification process.

FIG. 9 is a flow chart which shows an authentication process, by the prover algorithm P and the verifier algorithm V, between the authentication processing device 100b which executes an authentication process and the verification processing device 200b which executes a verification process.

A user who wants to authenticate that she is the person herself generates a secret key x and a public key F(x) in advance by the above described key generation algorithm Gen (step S21). The generation of this secret key x and public key F(x) is performed by an information processing apparatus capable of executing the key generation algorithm Gen.

When the user generates a secret key x and a public key F(x), the public key is registered in the verification processing device 200b (step S22). The secret key x is in a state in which the user can access it at any time while maintaining secrecy. While it is desirable for the user to memorize the contents of the secret key x if leakage of the secret key is to be prevented, since the secret key x is not as easy to remember as a password, it is assumed that it is written on paper or the like for a time when it is forgotten. Also, the user inputs the secret key x to the authentication processing device 100b, in order to execute an authentication process between the authentication processing device 100b and the verification processing device 200b (step S23). When the secret key x is input to the authentication processing device 100b, an authentication process is executed, by a prover algorithm P and a verifier algorithm V, between the authentication processing device 100b and the verification processing device 200b (step S24).

Compared with the condition in which the secret key is memorized, in the case where the secret key is written down on paper or the like, there is a high risk that the contents of this secret key will be leaked to another person due to peaking or secret photography by the other person. In this way, in the case where the secret key x is directly input from the outside to the authentication processing device 100b, and an authentication process is executed, by a prover algorithm P and a verifier algorithm V, between the authentication processing device 100b and the verification processing device 200b, if this secret key x is leaked to another person, there is the possibility that this other person will execute a regular authentication by using the secret key x. In this case, the verification processing device 200b is not able to distinguish whether the input of the secret key x is by a regular user or is by another person.

Accordingly, in the second embodiment of the present disclosure, such as described above, a plurality of secret keys corresponding to one public key are generated, one of them is stored by the user as a secret key to be normally used, and another is written down by the user, for example, on paper or the like for temporary use for the time when the contents of the secret key have been forgotten. Also, the verification processing device 200b, at the time when performing an authentication process, judges which of the secret keys is the secret key input to the authentication processing device 100b, and determines whether or not it is the temporary use secret key which is not the secret key normally used, that is, the secret key written down on paper or the like by the user. At the time when performing an authentication process, a temporary use secret key being used is judged by the verification processing device 200b, and if the temporary use secret key is used, the user can be reminded whether it is an intentional use of the temporary use secret key by the user, or whether there has been a leakage of the temporary use secret key, by notifying to the user that the temporary use secret key has been used.

[Operations]

Figure 10:
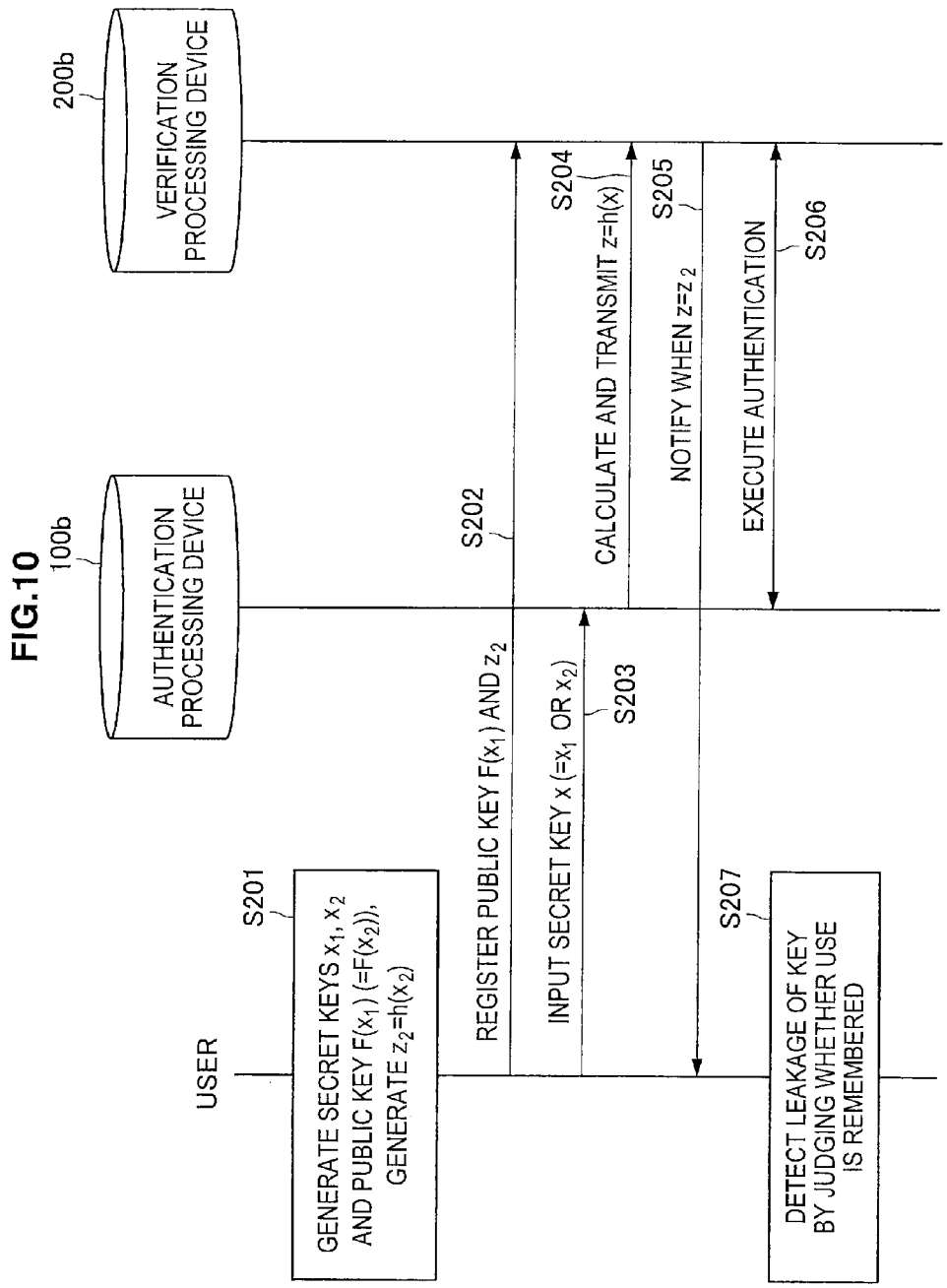
FIG. 10 is a flow chart which shows the operations of a second embodiment of the present disclosure.

FIG. 10 is a flow chart which shows an authentication process between the authentication processing device 100b, to which a secret key is input, and a verification processing device 200b which executes a verification process, according to the second embodiment of the present disclosure. The flow chart shown in FIG. 10 shows an authentication process in the case where a user who wants to authenticate that she is the person herself generates a public key and two secret keys corresponding to this public key.

The user who wants to authenticate that she is the person herself generates secret keys $x_1$, $x_2$ and a public key $F(x_1)$ in advance by the above described key generation algorithm Gen, applies a hash function h to the secret keys $x_1$, $x_2$, and generates a hash value $z_2 = h(x_2)$ (step S201). Here, the public key $F(x_1)$ satisfies $F(x_1) = F(x_2)$. The generation of these secret keys $x_1$, $x_2$ and public key $F(x_1)$ is performed by an information processing apparatus capable of executing the key generation algorithm Gen. For example, the user strictly keeps the secret key $x_1$, without showing it to any another person, by memorizing the secret key or writing down the secret key on paper or the like, as a normal use secret key, and usually carries the secret key $x_2$, which is written down on a paper medium or the like, as a temporary use secret key.

The user generates the secret keys $x_1$, $x_2$ and the public key $F(x_1)$ by executing the key generation algorithm, and when a hash value $z_2$ is additionally generated by applying a hash function to the secret key $x_2$, the public key $F(x_1)$ and the hash value $z_2$ are registered in the verification processing device 200b (step S202). Then, the user inputs one secret key x from among the secret keys $x_1$, $x_2$ to the authentication processing device 100b, in order to execute an authentication process, by a prover algorithm P and a verifier algorithm V, between the authentication processing device 100b and the verification processing device 200b (step S203).

When the secret key is input from the user, the authentication processing device 100b calculates a hash value z by applying the hash function h to the input secret key, and transmits this hash value z to the verification processing device 200b (step S204). The verification processing device 200b compares whether or not the hash value z transmitted from the authentication processing device 100b and the hash value $z_2$ registered from the user in advance match each other.

If the hash values z and $z_2$ do not match, the verification processing device 200b does not perform any particular process, and if the hash values z and $z_2$ do match, the verification processing device 200b notifies to the user, by a method such as email or the like, that the temporary use secret key $x_2$ has been input to the authentication processing device 100b (step S205).

Then, an authentication process is executed, by a prover algorithm P and a verifier algorithm V, between the authentication processing device 100b and the verification processing device 200b, using the secret key x input in the above described step S203 (step S206). Then, if the user receives a notification from the verification processing device 200b, leakage of the key can be detected by judging whether or not it is a use of the temporary use secret key $x_2$ which the user herself is not able to remember (step S207).

As described above, in the present embodiment it is assumed that the user usually carries the secret key $x_2$, which is written down on a paper medium or the like, as a temporary use secret key. Therefore, this secret key $x_2$ is information which has a high possibility of being accessed by another person by some reason such as a loss of the paper medium.

However, in this way, the user can be notified, by a notification from the verification processing device 200b, whether the secret key $x_2$ used at the time of performing an authentication process was input by the user herself or was input by another person, by registering a hash value generated from the secret key $x_2$ in the verification processing device 200b along with the public key. The user who uses the secret keys $x_1$, $x_2$ can detect whether or not there has been a leakage of the temporary use secret key by the notification from the verification processing device 200b, and in the case where there has been a leakage, the user can prevent expansion of the damage by invalidating the public key registered in the verification processing device 200b.

Note that while in the above described description the verification processing device 200b does not perform any particular process if the hash values z and $z_2$ do not match each other, the present disclosure is not limited to such an example. Since the hash values z and $z_2$ not matching each other is used by the normal use secret key $x_1$, the verification processing device 200b may notify to the user, by some method such as email or the like, that the normal use secret key $x_1$ has been used.

4. THE THIRD EMBODIMENT OF THE PRESENT DISCLOSURE

[Overview]

Next, an overview of a third embodiment of the present disclosure will be described. The third embodiment of the present disclosure is technology applicable to the case where the rights of authentication are shared between users by providing each different user with one of two or more secret keys.

Figure 11:
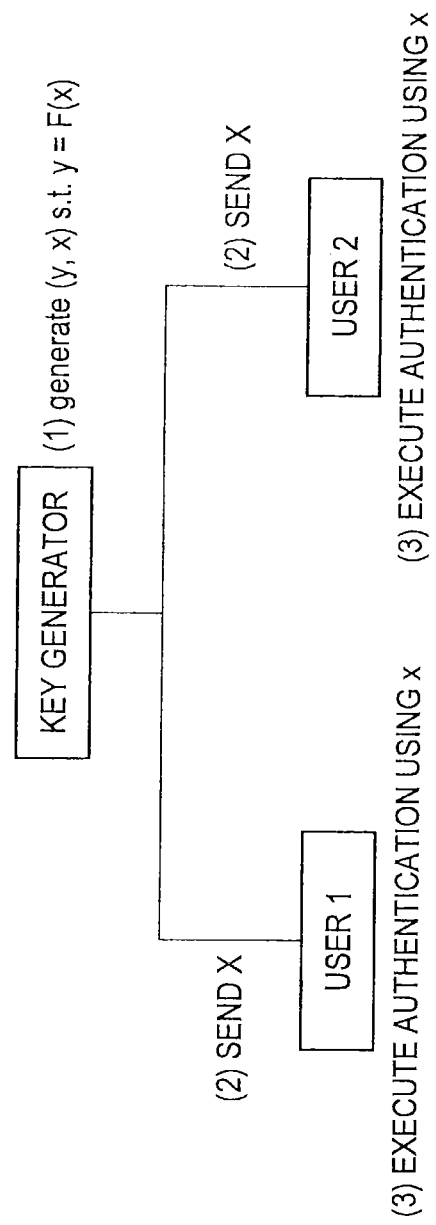
FIG. 11 is an explanatory view which shows the concept of an authentication system which provides a secret key x to each different user, by a key generator generating a shared secret key x.

FIG. 11 is an explanatory view which shows the concept of an authentication system which provides a secret key x to each different user, by a key generator generating a shared secret key x. The key generator generates a public key y=F(x) and a secret key x, and sends the generated secret key to users 1 and 2. The users 1 and 2, to whom the secret key x is sent from the key generator, execute authentication using this secret key x. That is, a shared secret key x is shared by the users 1 and 2.

However, if such a same secret key is provided to a plurality of users, in the case where it is revealed that the secret key has been leaked, by the secret key being published on a web site on the internet or the like, which user leaked the contents of the secret key will not be able to be detected. Accordingly, in the third embodiment of the present disclosure, a mechanism is disclosed capable of easily tracking which user leaked the secret key, in the case where it is revealed that the secret key has been leaked.

As described above, when an MQ function is used for the generation of a secret key, a plurality of different secret keys corresponding to a same public key can be generated. Therefore, in the case where it is revealed that the secret key has been leaked, since which user leaked the secret key can be easily tracked by sending different secret keys to each of a plurality of users, it becomes a deterrent against the leakage of the secret key.

Figure 12:
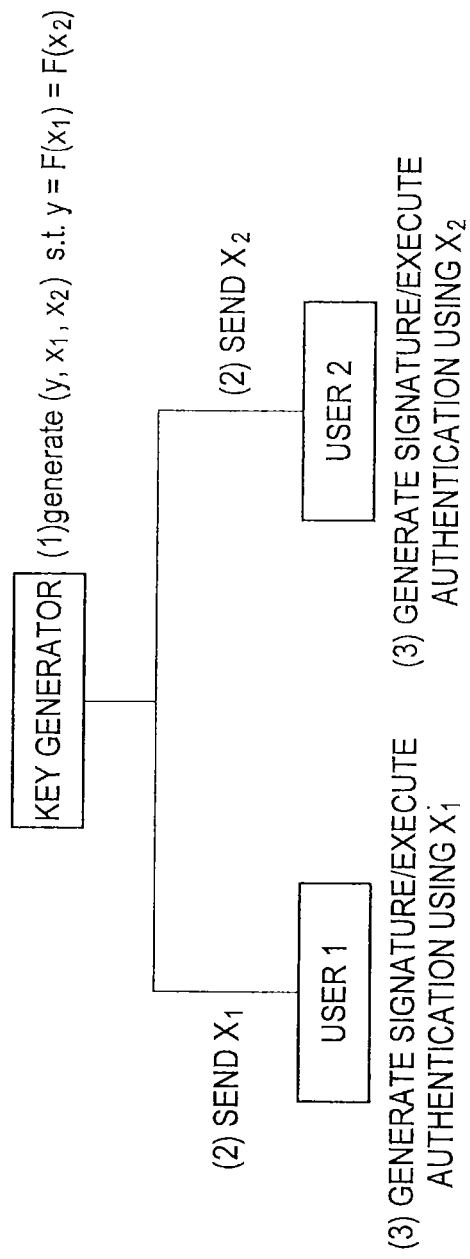
FIG. 12 is an explanatory view which shows the concept of an authentication system according to a third embodiment of the present disclosure.

FIG. 12 is an explanatory view which shows the concept of an authentication system according to the third embodiment of the present disclosure. Shown in FIG. 12 is the concept of an authentication system which provides secret keys $x_1$, $x_2$ to each different user, by a key generator generating different secret keys $x_1$, $x_2$.

The key generator generates a plurality of different secret keys $x_1$, $x_2$ corresponding to a same public key y, by using the above described key generation algorithm, and sends the secret key $x_1$ to a user 1 and the secret key $x_2$ to a user 2. Further, the key generator manages which secret key is sent to which user. Then, an authentication process and a signature generation process are each executed with a verifier, by the user 1 using the secret key $x_1$ and the user 2 using the secret key $x_2$.

In this way, in the case where it is revealed that the secret key has been leaked, which user leaked the secret key can be easily tracked by managing which user has been sent which secret key, by generating a plurality of different secret keys corresponding to a same public key, and sending a different secret key to each user, and it becomes a deterrent against the leakage of the secret key.

Note that while the above described example describes the case where a plurality of different secret keys corresponding to a same public key are generated, and different secret keys are sent to each user, the third embodiment of the present disclosure is similarly applicable, when an authentication process is executed by secret keys in a plurality of servers, to the case where a plurality of different secret keys corresponding to a same public key are generated, and the different secret keys are sent to each server.

Figure 13:
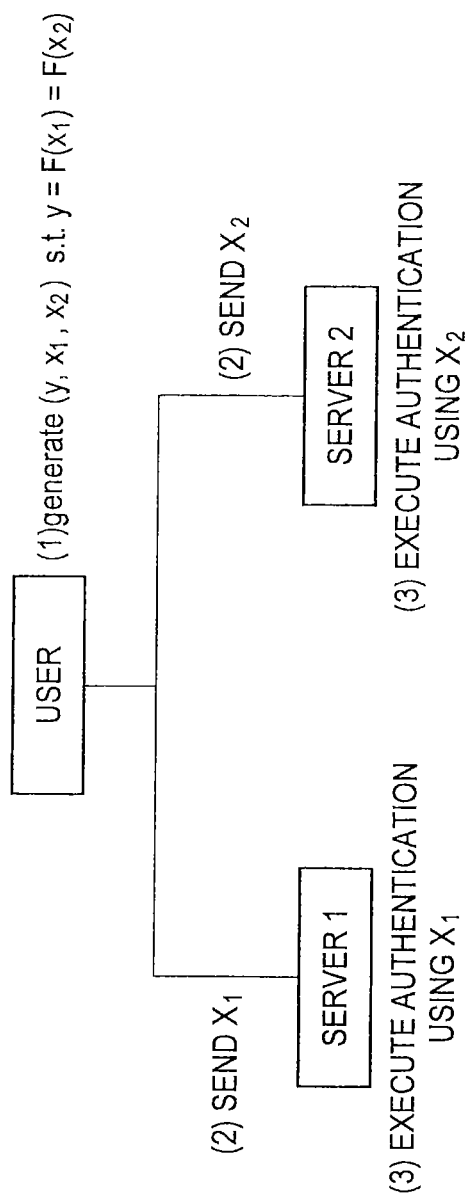
FIG. 13 is an explanatory view which shows the concept of an authentication system according to a third embodiment of the present disclosure.

FIG. 13 is an explanatory view which shows the concept of an authentication system according to the third embodiment of the present disclosure. Shown in FIG. 13 is the concept of an authentication system which provides secret keys $x_1$, $x_2$ to each different server, by a key generator generating different secret keys $x_1$, $x_2$. In this way, the key generator provides the secret keys $x_1$, $x_2$ to each different server, and manages which secret key is sent to which server. Also, if each server becomes a prover and a signer and an authentication process and a signature generation process are each executed with a verifier, from which server the secret key has been leaked can be easily tracked in the case where it is revealed that the secret key has been leaked.

5. MODIFIED EXAMPLES

While the above description shows the case where two secret keys are generated for one public key by using an MQ function, c secret keys can be generated for one public key by setting n values of an MQ function such as described above, which is constituted by an n variable multi-order polynomial in m lines, to c times that of m (c is an integer of 2 or more).

Also, as a modified example of the above described first embodiment, c secret keys generated for one public key are all included in the authentication processing device 100a, and when performing an authentication process, the leakage of a secret key by a power analysis attack may be prevented by selecting one secret key at random from among the c secret keys.

Further, as a modified example of the above described second embodiment, separate roles may be provided for each of the three or more types of secret keys. While the above described second embodiment notifies a user that the temporary use secret key has been used, by email or the like, from the verification processing device 200b in the case where a temporary use secret key is used, three secret keys may be generated for one public key, for example, two secret keys from among these may be temporary use secret keys, and different roles may be provided for each of these temporary use secret keys.

Further, as a modified example of the above described third embodiment, rights may be shared between three or more people, by providing c secret keys generated for one public key to each different user, and in the case where it is revealed that a secret key has been leaked, it can be easy to track which user leaked the secret key.

As described above, when performing an authentication process by a secret key generated using an MQ function, a one-time authentication process is set as a modified example of the above described first embodiment, and it is known that the probability of a false success in the one-time authentication process can be reduced by repeating the authentication process a plurality of times (a plurality of rounds) by the above described n-pass public key authentication scheme. Also, in the case where a plurality of secret keys can be generated for one public key, an authentication process is also possible by using different secret keys for each round. Therefore, as a modified example of the above described first embodiment, the authentication processing device 100a may select a secret key at random for each round, when performing a one-time authentication process.

Figure 14:
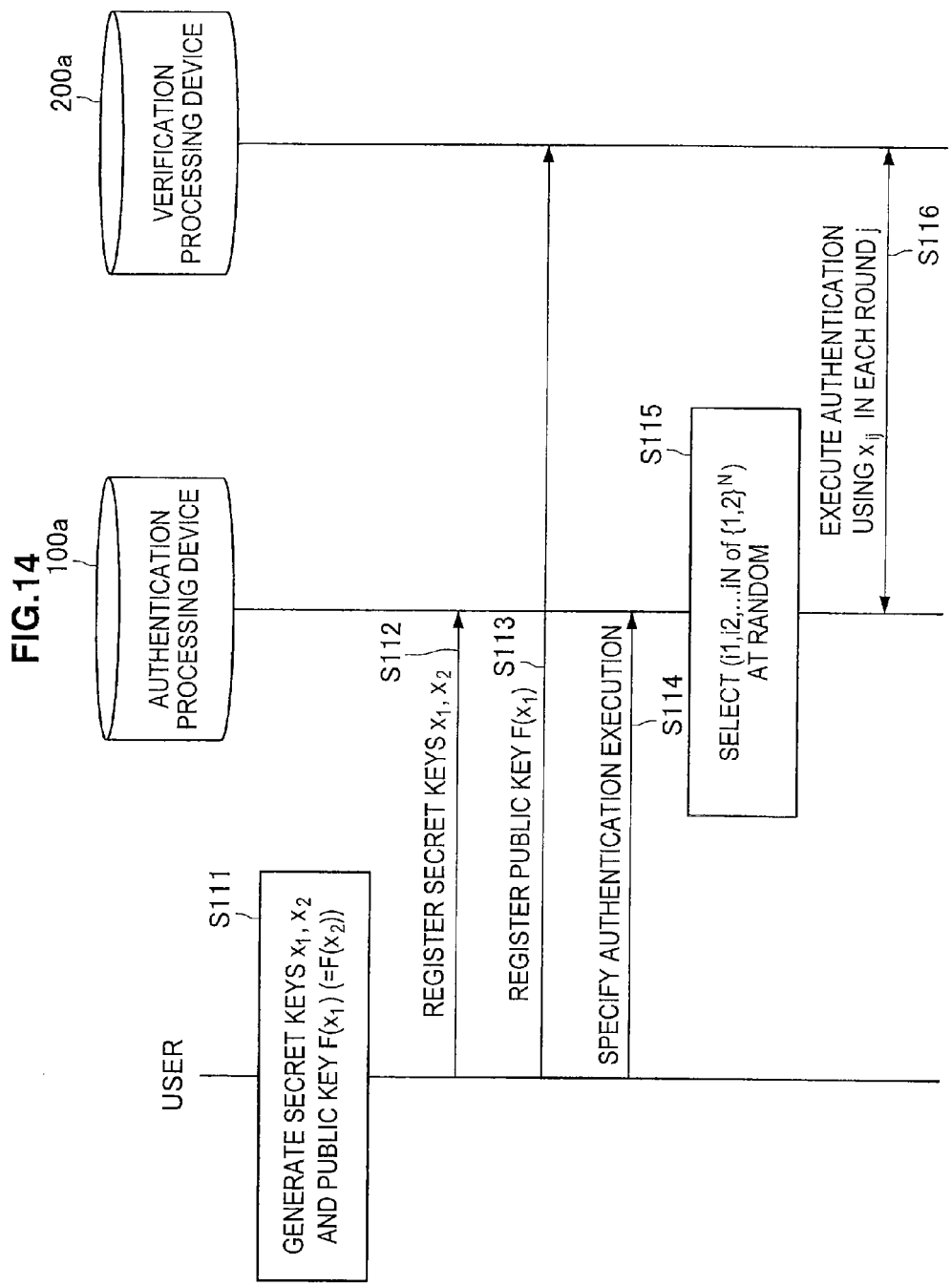
FIG. 14 is a flow chart which shows the operations of a modified example of the first embodiment of the present disclosure.

FIG. 14 is a flow chart which shows an authentication process between the authentication processing device 100a, in which a secret key is stored, and a verification processing device 200a which executes a verification process, according to a modified example of the first embodiment of the present disclosure. The flow chart shown in FIG. 14 shows an authentication process in the case where a user who wants to authenticate that she is the person herself generates a public key and two secret keys corresponding to this public key.

The user who wants to authenticate that she is the person herself generates secret keys $x_1$, $x_2$ and a public key $F(x_1)$ in advance by the above described key generation algorithm Gen (step S111). Here, the public key $F(x_1)$ satisfies $F(x_1)=F(x_2)$. The generation of these secret keys $x_1$, $x_2$ and public key F(x1) is performed by an information processing apparatus capable of executing the key generation algorithm Gen.

When the user generates secret keys $x_1$, $x_2$ and a public key $F(x_1)$, the secret keys $x_1$, $x_2$ are registered in the authentication processing device 100a while maintaining secrecy (step S112), and the public key $F(x_1)$ is registered in the verification processing device 200a (step S113). Then, when the user specifies authentication execution to the authentication processing device 100a (step S114), the authentication processing device 100a first selects ((i1, i2, . . . , iN) of {1,2}) at random (step S115). Here, N represents the round number in the one-time authentication process. Therefore, the above described step S115 is a process in which the authentication processing device 100a selects a secret key to be used at random for each round from among $x_1$, $x_2$.

Then, an authentication process is performed, between the authentication processing device 100a and the verification processing device 200a, using a secret key $x_{ij}$ corresponding to the i selected in the above described step S115 (step S116). Note that j is an integer from 1 up to N.

In this way, an effect can be expected in which a 1 bit DPA by a power analysis attack becomes difficult, due to the authentication processing device 100a selecting a secret key to be used at random for each round in the one-time authentication process.

While the above described embodiment shows an example in the case of performing generation of a secret key using an MQ function, it is needless to say that it can be similarly applicable to the case of a digital signature using an MQ function. Further, while the above described embodiment uses an MQ function when generating a plurality of secret keys for one public key, in this way, it is needless to say that if there is an algorithm which can generate a plurality of secret keys for one public key, the present disclosure will not be limited to that of using an MQ function.

Here, an example of an algorithm for an authentication process executed in each of the above described embodiments will be described. Here, an algorithm of a 3-pass scheme will be described. An algorithm of a 3-pass scheme is constituted by a key generation algorithm Gen, a prover algorithm P, and a verifier algorithm V such as described hereinafter.

The key generation algorithm Gen generates multivariable polynomials $f_1(x_1, \ldots, x_n), \ldots, f_m(x_1, \ldots, x_n)$ in m lines defined on a ring K, and a vector $(s=(s_1, \ldots, s_n)$ of $K^n)$. Next, the key generation algorithm Gen calculates $y=(y_1, \ldots, y_m) \leftarrow (f_1(s), \ldots, f_m(s))$. Then, the key generation algorithm Gen sets $(f_1(x_1, \ldots, x_n), \ldots, f_m(x_1, \ldots, x_n), y)$ to a public key pk, and sets s to a secret key.

Hereinafter, a process in which a prover algorithm P is executed and a process in which a verifier algorithm V is executed in an interactive protocol will be described with reference to FIG. 15. In this interactive protocol, the prover shows to the verifier that "she herself knows s which satisfies y=F(s)" without leaking any information of the secret key s to the verifier. On the other hand, the verifier verifies whether or not the prover knows s which satisfies y=F(s). Note that the public key pk is disclosed to the verifier. Further, the secret key s is managed in secret by the prover. Hereinafter, a description will be carried forward in accordance with the flow chart shown in FIG. 15.

Figure 15:
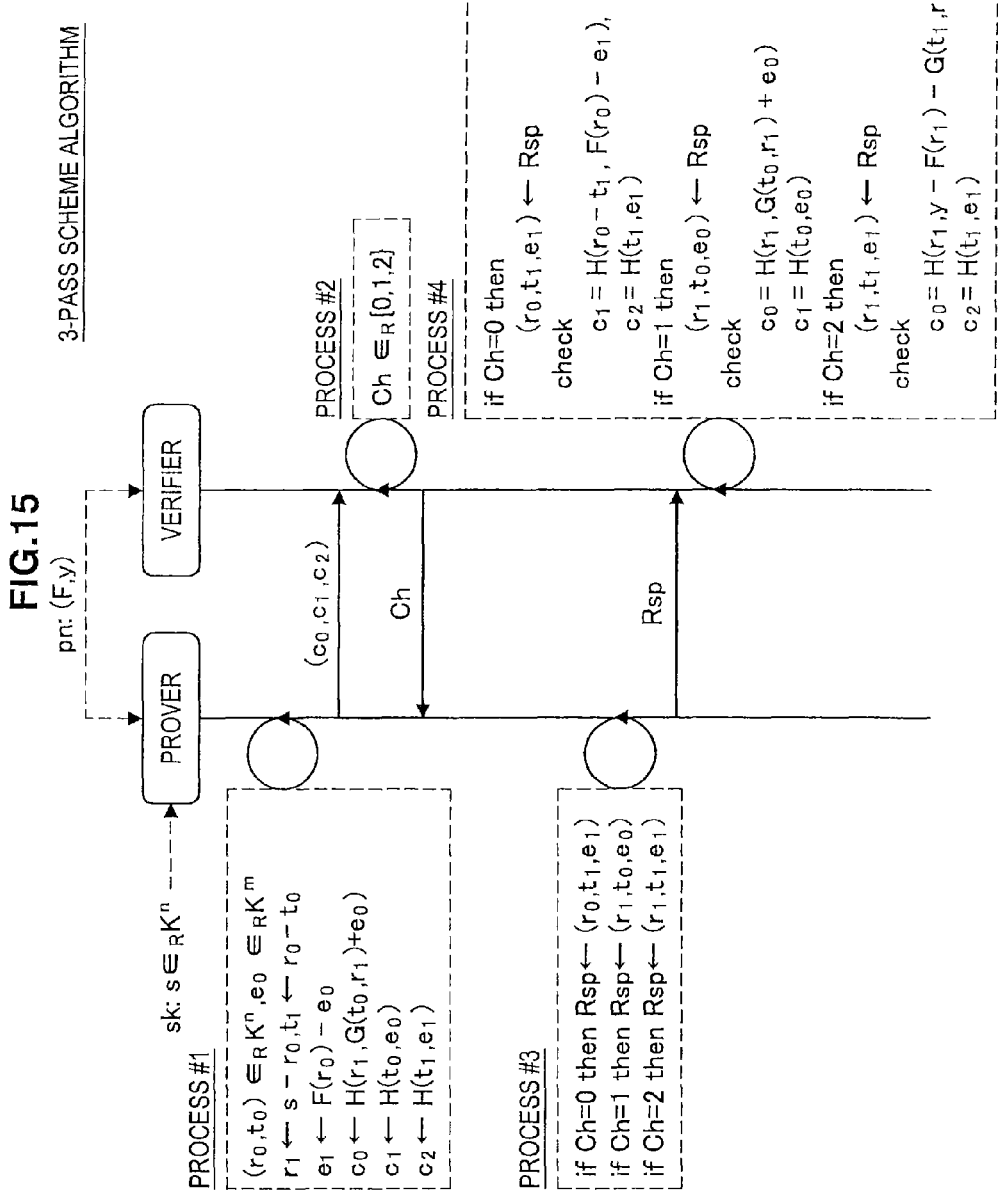
FIG. 15 is an explanatory view illustrating an efficient algorithm according to a 3-pass public key authentication scheme.

Process #1:

As shown in FIG. 15, first the prover algorithm P generates vectors ($r_0$, $t_0$ of $K^n$) and ($e_0$ of $k^m$) at random. Next, the prover algorithm P calculates $r_1 \leftarrow s-r_0$. This calculation corresponds to an operation to mask the secret key s by the vector $r_0$. In addition, the prover algorithm P calculates $t_1 \leftarrow r_0-t_0$. Next, the prover algorithm P calculates $e_1 \leftarrow F(r_0)-e_0$.

Process #1 (Continued):

Next, the prover algorithm P calculates $c_0 \leftarrow H(r_1, G(t_0, r_1)+e_0)$. Next, the prover algorithm P calculates $c_1 \leftarrow H(t_0, e_0)$. Next, the prover algorithm P calculates $c_2 \leftarrow H(t_1, e_1)$. A message ($c_0, c_1, c_2$) generated in process #1 is sent to the verifier algorithm V.

Process #2:

The verifier algorithm V which received the message ($c_0, c_1, c_2$) selects which verification message is to be used, from among the three verification patterns. For example, the verifier algorithm V selects one numerical value from among the three numerical values {0,1,2} which represent the type of verification pattern, and sets the selected numerical value to a request Ch. This request Ch is sent to the prover algorithm P.

Process #3:

The prover algorithm P which received the request Ch generates a response Rsp to send to the verifier algorithm V in accordance with the received request Ch. In the case where Ch=0, the prover algorithm P generates a response Rsp=($r_0, t_1, e_1$). In the case where Ch=1, the prover algorithm P generates a response Rsp=($r_1, t_0, e_0$). In the case where Ch=2, the prover algorithm P generates a response Rsp=($r_1, t_1, e_1$). The response Rsp generated in process #3 is sent to the verifier algorithm V.

Process #4:

The verifier algorithm V which received the response Rsp executes the following verification process by using the received response Rsp.

In the case where Ch=0, the verifier algorithm V verifies whether or not the equal sign of $c_1 = H(r_0-t_1, F(r_0)-e_1)$ holds. In addition, the verifier algorithm V verifies whether or not the equal sign of $c_2 = H(t_1, e_1)$ holds. The verifier algorithm V outputs a value of 1 which indicates a successful authentication in the case where these verifications are all successful, and outputs a value of 0 which indicates an authentication failure in the case where there is a failure in the verifications.

In the case where Ch=1, the verifier algorithm V verifies whether or not the equal sign of $c_0 = H(r_1, G(t_0, r_1)+e_0)$ holds. In addition, the verifier algorithm V verifies whether or not the equal sign of $c_1 = H(t_0, e_0)$ holds. The verifier algorithm V outputs a value of 1 which indicates a successful authentication in the case where these verifications are all successful, and outputs a value of 0 which indicates an authentication failure in the case where there is a failure in the verifications.

In the case where Ch=2, the verifier algorithm V verifies whether or not the equal sign of $c_0 = H(r_1, y-F(r_1)-G(t_1, r_1)-e_1)$ holds. In addition, the verifier algorithm V verifies whether or not the equal sign of $c_2 = H(t_1, e_1)$ holds. The verifier algorithm V outputs a value of 1 which indicates a successful authentication in the case where these verifications are all successful, and outputs a value of 0 which indicates an authentication failure in the case where there is a failure in the verifications.

Heretofore, a configuration example of an efficient algorithm according to a 3-pass scheme has been described. Of course, the algorithm when performing an authentication process in the present disclosure is not limited to such an example, and it is needless to say that another algorithm can be used in a similar authentication process, in the case where a public key and a plurality of secret keys corresponding to this public key are generated from multivariable polynomials in m lines.

6: HARDWARE CONFIGURATION

Figure 16:
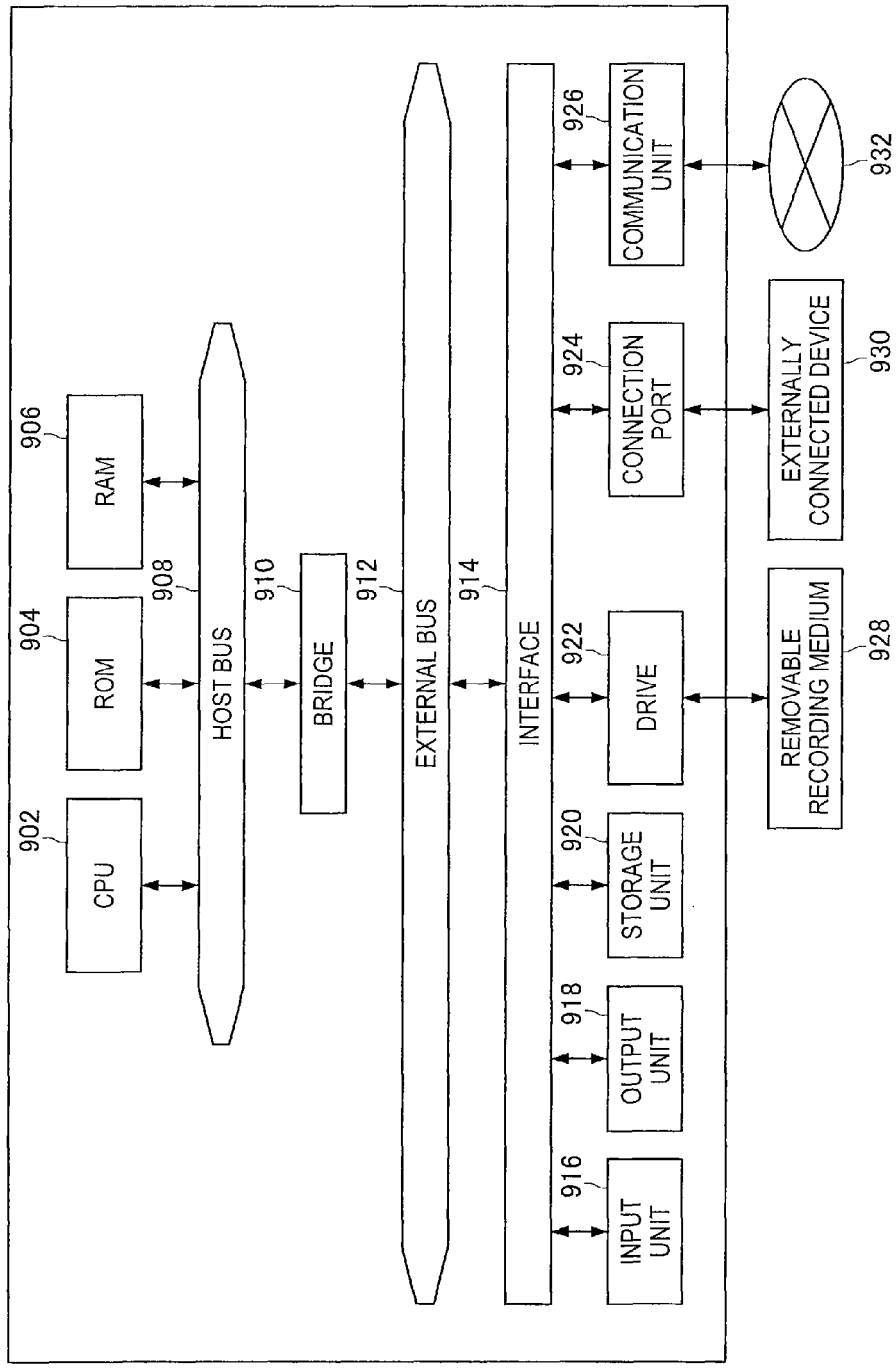
FIG. 16 is an explanatory view illustrating a hardware configuration example of an information processing apparatus capable of executing the algorithms according to each embodiment of the present disclosure.

Each algorithm described above can be performed by using, for example, the hardware configuration of the information processing apparatus shown in FIG. 16. That is, processing of each algorithm can be realized by controlling the hardware shown in FIG. 16 using a computer program. Additionally, the mode of this hardware is arbitrary, and may be a personal computer, a mobile information terminal such as a mobile phone, a PHS or a PDA, a game machine, a contact or contactless IC chip, a contact or contactless IC card, or various types of information appliances. Moreover, the PHS is an abbreviation for Personal Handy-phone System. Also, the PDA is an abbreviation for Personal Digital Assistant.

As shown in FIG. 16, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is a device for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

7. CONCLUSION

According to the present disclosure as described above, a detection method of key leakage, a prevention method of key leakage, and a suppression method of key leakage are implemented, by using a public key authentication scheme in which a plurality of secret keys can be generated for a same public key, such as a key generation algorithm using an MQ function.

In a first embodiment of the present disclosure, a plurality of secret keys generated for a same public key are recorded in an authentication processing device, as power analysis attack countermeasures for an authentication processing device such as an IC card in which a secret key is recorded. When performing an authentication process, the authentication processing device selects one secret key at random from among the plurality of secret keys. Extraction of a secret key by a power analysis attack can be made difficult by having the authentication processing device select one secret key at random from among the plurality of secret keys when performing an authentication process.

In a second embodiment of the present disclosure, in the case where a secret key is input to an authentication processing device, if a temporary use secret key, which is not a normal use secret key, is input to the authentication processing device, a user is notified that the temporary use secret key has been used, via the verification processing device. The user can judge whether the temporary use secret key has been intentionally used or whether it has been leaked, by being notified that the temporary use secret key has been used.

In a third embodiment of the present disclosure, a plurality of secret keys corresponding to one public key are each sent to different users. In the case where one secret key is leaked, since who leaked the secret key can be easily tracked by sending each of a plurality of secret keys corresponding to one public key to different users, it becomes a deterrent against leakage of the secret key.

Note that while each of the above described embodiments have been described by showing examples of secret keys generated by using an MQ function, as a plurality of secret keys which can be generated for one public key, the present disclosure is not limited to such examples. According to a public key authentication scheme and a digital signature scheme which can generate a plurality of secret keys for one public key, it is needless to say that these schemes are similarly applicable to each of the above described embodiments. Further, while in each of the above described embodiments an authentication processing device which executes an authentication process and a verification processing device which implements a verification process may each be included in separate apparatuses, they may also be included in the same apparatus.

Lastly, the technical contents according to the embodiment of the present technology will be briefly described. The technical contents stated here can be applied to various information processing apparatuses, such as a personal computer, a mobile phone, a portable game machine, a portable information terminal, an information appliance, a car navigation system, and the like. Further, the function of the information processing apparatus described below can be realized by using a single information processing apparatus or using a plurality of information processing apparatuses. Furthermore, a data storage device and an arithmetic processing device which are used for performing a process by the information processing apparatus described below may be mounted on the information processing apparatus, or may be mounted on a device connected via a network.

Note that the above described key generation algorithm Gen, the prover algorithm P, the verifier algorithm V, the signature generation algorithm Sig, and the signature verification algorithm Ver are examples of a key selection section and a process execution section according to an embodiment of the present disclosure.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An information processing apparatus including:

a key selection section configured to select one out of a plurality of different secret keys, in a public key authentication scheme or a digital signature scheme in which each of the plurality of secret keys exists for one public key registered in a verifier; and a process execution section configured to execute, by using the secret key selected by the key selection section, an authentication process with the verifier by the public key authentication scheme or a digital signature generation process to the verifier by the digital signature scheme.

(2)
The information processing apparatus according to (1),
wherein the key selection section is configured to select one out of the plurality of secret keys at random when performing the authentication process with the verifier or the digital signature generation process.

(3)
The information processing apparatus according to (2),
wherein the key selection section is configured to select one out of the plurality of secret keys at random for each authentication process or digital signature generation process, in a case where the process execution section completes a one-time authentication by repeating the authentication process with the verifier, or in a case where the process execution section completes a generation of a one-time digital signature by repeating the digital signature generation process.

(4)
The information processing apparatus according to (1),
wherein the process execution section is configured to register, in the verifier, a first hash value obtained by applying a hash function to a first secret key within the plurality of secret keys.

(5)
The information processing apparatus according to (4),
wherein the process execution section is configured to apply the hash function to a secret key used when performing the authentication process with the verifier by the public key authentication scheme or the digital signature generation process to the verifier by the digital signature scheme, and transmit, to the verifier, a second hash value to be compared with the first hash value.

(6)
The information processing apparatus according to (5), further including:
a comparison function section configured to compare the first hash value and the second hash value when the verifier performs a verification process using the public key authentication scheme or the digital signature scheme, and execute a prescribed notification process in accordance with a result of the comparison.

(7)
The information processing apparatus according to (1),
wherein the plurality of secret keys are registered in respective different apparatuses, and
wherein the key selection section is configured to select the registered secret keys.

(8)
The information processing apparatus according to (1),
wherein the public key authentication scheme or the digital signature scheme is a public key authentication scheme which sets (s of $K^n$) to a secret key, and sets a multi-order polynomial $f_i(x_1, \ldots, x_n)$ (i=1 to m) on a ring K and $y_i=f_i(s)$ to a public key.

(9)
An information processing method including:
selecting one out of a plurality of different secret keys, in a public key authentication scheme or a digital signature scheme in which each of the plurality of secret keys exists for one public key registered in a verifier; and
executing, by using the secret key selected by the key selection step, an authentication process with the verifier by the public key authentication scheme or a digital signature generation process to the verifier by the digital signature scheme.

(10)
A non-transitory computer-readable medium including a computer program, which when executed by a computer, causes the computer to:
select one out of a plurality of different secret keys, in a public key authentication scheme or a digital signature scheme in which each of the plurality of secret keys exists for one public key registered in a verifier; and
execute, by using the secret key selected by the key selection step, an authentication process with the verifier by the public key authentication scheme or a digital signature generation process to the verifier by the digital signature scheme.

(11)
An information processing apparatus including:
a comparison processing section configured to acquire, in a public key authentication scheme or an digital signature scheme in which a plurality of different secret keys exist for one public key, a first hash value obtained by a prover applying a hash function to a first secret key within the plurality of secret keys, and a second hash value obtained by the prover applying a hash function to a secret key used when performing an authentication process with a verifier or a digital signature generation process to the verifier by the digital signature scheme; compare the first hash value and the second hash value when performing a verification process using the public key authentication scheme or the digital signature scheme; and execute a prescribed notification process to the prover in accordance with a result of the comparison.

The present disclosure contains subject matter related to that disclosed in Japanese Priority Patent Application JP 2012-198343 filed in the Japan Patent Office on Sep. 10, 2012, the entire content of which is hereby incorporated by reference.

What is claimed is:
1. An information processing apparatus, comprising:
a memory configured to store instructions; and
one or more processors configured to execute the instructions stored in the memory, wherein the one or more processors are configured to:
apply a hash function to a first secret key of a plurality of different secret keys to obtain a first hash value, wherein the first hash value is registered in a verifier, and
wherein the first secret key is a temporary use secret key;
select an input secret key of the plurality of different secret keys in a public key authentication scheme or a digital signature scheme,
wherein each of the plurality of different secret keys exists for a public key registered in the verifier;
apply the hash function to the selected input secret key to obtain a second hash value;
transmit the second hash value to the verifier; and
execute, based on the selected input secret key, an authentication process with the verifier by the public key authentication scheme or a digital signature generation process to the verifier by the digital signature scheme,
wherein the verifier compares the second hash value with the first hash value to verify that the selected input key for the authentication process is input by a registered user of the information processing apparatus, and wherein the verifier sends a notification to the registered user to confirm a leakage of the first secret key based on the comparison of the second hash value and the first hash value, and wherein the registered user invalidates the first secret key based on the notification.

2. The information processing apparatus according to claim 1, wherein the one or more processors are further configured to select one out of the plurality of different secret keys at random based on the execution of the authentication process with the verifier or the digital signature generation process.

3. The information processing apparatus according to claim 2, wherein the one or more processors are further configured to select one out of the plurality of different secret keys at random for each of the authentication process or the digital signature generation process, based on completion of a one-time authentication by repetition of the authentication process with the verifier, or based on completion of a generation of a one-time digital signature by repetition of the digital signature generation process.

4. The information processing apparatus according to claim 1, wherein the one or more processors are further configured to register a third hash value in a storage device of the verifier, wherein the third hash value is obtained by application of the hash function to a second secret key of the plurality of different secret keys.

5. The information processing apparatus according to claim 4, wherein the one or more processors are further configured to transmit the second hash value to the verifier for the comparison with the first hash value.

6. The information processing apparatus according to claim 5, wherein the one or more processors are further configured to:
compare the first hash value and the second hash value at a time the verifier executes a verification process based on the public key authentication scheme or the digital signature scheme, and
execute a notification process based on a result of the comparison.

7. The information processing apparatus according to claim 1,
wherein the plurality of different secret keys are registered in respective different apparatuses, and
wherein the one or more processors are further configured to select the plurality of different secret keys that are registered in the respective different apparatuses.

8. The information processing apparatus according to claim 1, wherein the public key authentication scheme or the digital signature scheme sets vector (s of Kn) to the selected input secret key, and sets a multi-order polynomial fi (x1, . . . , xn) (i=1 to m) on a ring K, and yi=fi(s) to the public key, where:
n is an integer that is greater than 1, and represents a number of variables in the multi-order polynomial;
m is an integer that is greater than 1, and represents a number of lines in the multi-order polynomial; and
s represents the input secret key.

9. The information processing apparatus according to claim 1, wherein the one or more processors are further configured to repeat the authentication process or the digital signature generation process with the verifier a plurality of times, and select a different set of secret keys from the plurality of different secret keys each time the authentication process or the digital signature generation process is repeated.

10. An information processing method, comprising:
in an information processing apparatus comprising one or more processors:
applying, by the one or more processors, a hash function to at least one secret key of a plurality of different secret keys to obtain a first hash value,
wherein the first hash value is registered in a verifier device, and
wherein the at least one secret key is a temporary use secret key;
selecting, by the one or more processors, an input secret key of the plurality of different secret keys, in a public key authentication scheme or a digital signature scheme,
wherein each of the plurality of different secret keys exists for one public key registered in the verifier device;
applying, by the one or more processors, the hash function to the selected input secret key to obtain a second hash value;
transmitting, by the one or more processors, the second hash value to the verifier device; and
executing, by the one or more processors using the selected input secret key, an authentication process with the verifier device by the public key authentication scheme or a digital signature generation process to the verifier device by the digital signature scheme,
wherein the verifier device compares the second hash value with the first hash value to verify that the selected input key for the authentication process is input by a registered user of the information processing apparatus,
wherein the verifier device sends a notification to the registered user to confirm a leakage of the at least one secret key based on the comparison of the second hash value and the first hash value, and
wherein the registered user invalidates the at least one secret key based on the notification.

11. A non-transitory computer-readable storage medium having stored thereon, computer-executable instructions for causing a computer to execute operations, the operations comprising:
applying a hash function to at least one secret key of a plurality of different secret keys to obtain a first hash value,
wherein the first hash value is registered in a verifier, and
wherein the at least one secret key is a temporary use secret key;
selecting an input secret key of the plurality of different secret keys in a public key authentication scheme or a digital signature scheme,
wherein each of the plurality of different secret keys exists for one public key registered in the verifier; and
applying the hash function to the selected input secret key to obtain a second hash value;
transmitting the second hash value to the verifier; and
executing, based on the selected input secret key, an authentication process with the verifier by the public key authentication scheme or a digital signature generation process to the verifier by the digital signature scheme, wherein the verifier compares the second hash value with the first hash value to verify that the selected input key for the authentication process is input by a registered user of the information processing apparatus, wherein the verifier sends a notification to the registered user to confirm a leakage of the at least one secret key based on the comparison of the second hash value and the first hash value, and wherein the registered user invalidates the at least one secret key based on the notification.

12. An information processing apparatus, comprising:

a memory configured to store a set of instructions;

one or more processors configured to execute the set of instructions stored in the memory, wherein the one or more processors are configured to:

acquire, in a public key authentication scheme or a digital signature scheme, in which a plurality of different secret keys exist for one public key;

a first hash value obtained by a prover based on a hash function applied to at least one secret key of the plurality of different secret keys, and a second hash value obtained by the prover based on the hash function applied to a selected secret key of the plurality of different secret keys used for execution of an authentication process with a verifier or a digital signature generation process to the verifier by the digital signature scheme, wherein the at least one secret key is a temporary use secret key;

compare the first hash value and the second hash value at a time of execution of a verification process based on the public key authentication scheme or the digital signature scheme; and execute a notification process to send a notification to the prover to confirm a leakage of the at least one secret key based on the comparison between the first hash value and the second hash value, wherein the registered user invalidates the at least one secret key based on the notification.

* * * * *